US010222750B2

(12) United States Patent
Bang et al.

(10) Patent No.: US 10,222,750 B2
(45) Date of Patent: Mar. 5, 2019

(54) WATCH-TYPE WEARABLE DEVICE

(71) Applicant: Samsung Electronics Co., Ltd., Suwon-si, Gyeonggi-do (KR)

(72) Inventors: Hyosik Bang, Seongnam-si (KR); Soon-Youl Kwon, Yongin-si (KR); Gyu-Seok Shim, Suwon-si (KR); Dohyung Ha, Seoul (KR); Jin-Wan An, Daegu (KR); Jun-Taek Lee, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/365,054

(22) Filed: Nov. 30, 2016

(65) Prior Publication Data
US 2017/0168461 A1 Jun. 15, 2017

(30) Foreign Application Priority Data

Dec. 9, 2015 (KR) .................. 10-2015-0174964

(51) Int. Cl.
*G04B 19/04* (2006.01)
*G04B 45/04* (2006.01)
(Continued)

(52) U.S. Cl.
CPC ........... *G04B 19/042* (2013.01); *G04B 19/04* (2013.01); *G04B 45/04* (2013.01); *G04B 45/046* (2013.01);
(Continued)

(58) Field of Classification Search
CPC ...... G04B 19/04; G04B 19/042; G04B 45/04; G04B 45/046; G06F 1/163
See application file for complete search history.

(56) References Cited

U.S. PATENT DOCUMENTS 4,601,585 A * 7/1986 Farley .................. G04B 19/042
368/238
5,172,350 A * 12/1992 Walen .................... G04B 19/04
368/228
(Continued)

FOREIGN PATENT DOCUMENTS

DE 4226926 A1 * 9/1993 ........... G04B 19/046
GB 2 433 793 A 7/2007
(Continued)

OTHER PUBLICATIONS

Raspini, Andreas, English Translation of DE 4226926, originally published Sep. 23, 1993, retrieved from Espacenet on Mar. 5, 2018, full document.*

*Primary Examiner* — Daniel P Wicklund
(74) *Attorney, Agent, or Firm* — Jefferson IP Law, LLP

(57) ABSTRACT

An electronic device is provided. The electronic device includes a housing including a first face that faces in a first direction, a second face that faces in a second direction that is opposite to the first direction, and a side face that at least partially encloses a space between the first face and the second face, a transparent substrate that forms at least a portion of the first face of the housing, a display disposed within the space of the housing, and exposed through at least a portion of the transparent substrate, a mechanical watch structure at least partially disposed between the transparent substrate and the display, and configured to be physically movable, at least one processor electrically connected to the display and the mechanical watch structure, and a memory electrically connected to the at least one processor. The memory may store instructions that, when executed, cause the at least one processor to control the display and the mechanical watch structure.

9 Claims, 39 Drawing Sheets

(51) Int. Cl.
*G04G 9/00* (2006.01)
*G04G 17/04* (2006.01)
*G04G 21/08* (2010.01)
*G06F 1/16* (2006.01)

(52) U.S. Cl.
CPC .......... *G04G 9/007* (2013.01); *G04G 17/045* (2013.01); *G04G 21/08* (2013.01); *G06F 1/163* (2013.01)

(56) References Cited

U.S. PATENT DOCUMENTS

| | | | |
|---|---|---|---|
| 5,528,559 | A | 6/1996 | Lucas |
| 8,860,674 | B2 | 10/2014 | Lee et al. |
| 9,791,833 | B1 * | 10/2017 | Lider ............... G04B 19/04 |
| 2005/0155236 | A1 * | 7/2005 | Andrewes ......... G04B 49/02 |
| | | | 33/270 |
| 2007/0263491 | A1 | 11/2007 | Kim et al. |
| 2010/0165800 | A1 * | 7/2010 | Dierenbach ....... G04B 19/046 |
| | | | 368/221 |
| 2014/0276244 | A1 | 9/2014 | Kamyar |
| 2015/0109891 | A1 * | 4/2015 | Stranczl ........... G04B 19/042 |
| | | | 368/238 |
| 2016/0004276 | A1 * | 1/2016 | Stroetmann ......... G06F 1/163 |
| | | | 361/679.03 |
| 2017/0075317 | A1 * | 3/2017 | Cho ................ G04B 19/04 |
| 2017/0300016 | A1 * | 10/2017 | Lider ............... G04B 19/04 |
| 2018/0004166 | A1 * | 1/2018 | Lider ............... G04B 19/04 |

FOREIGN PATENT DOCUMENTS

| | | | |
|---|---|---|---|
| KR | 20-0324587 Y1 | 8/2003 | |
| KR | 10-0770830 B1 | 10/2007 | |
| WO | WO 0246846 A2 * | 6/2002 | ........... G04B 19/042 |

* cited by examiner

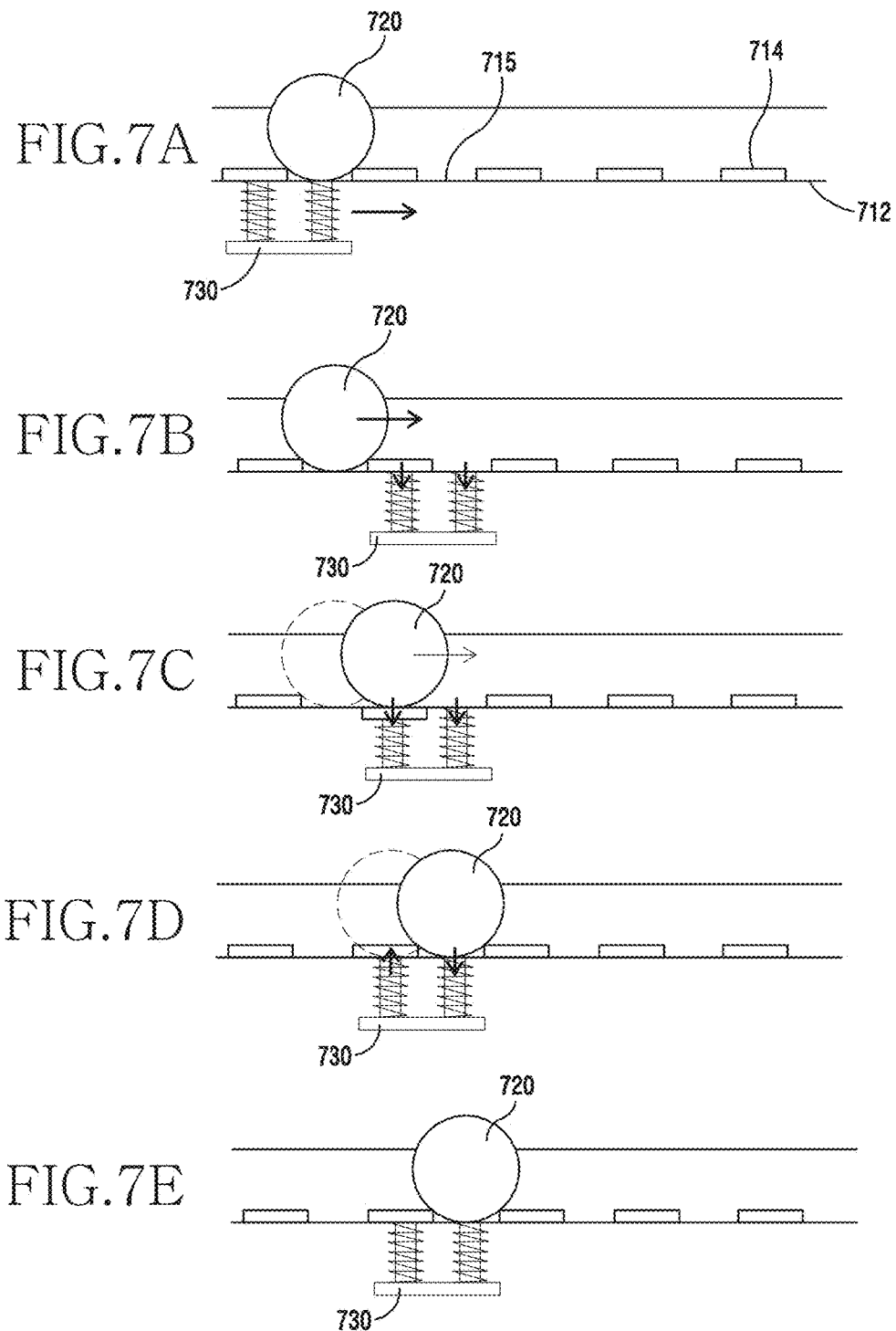

WATCH-TYPE WEARABLE DEVICE

CROSS-REFERENCE TO RELATED APPLICATION(S)

This application claims the benefit under 35 U.S.C. § 119(a) of a Korean patent application filed on Dec. 9, 2015 in the Korean Intellectual Property Office and assigned Serial number 10-2015-0174964, the entire disclosure of which is hereby incorporated by reference.

TECHNICAL FIELD

The present disclosure relates to a watch-type wearable electronic device (which may also be referred to as a watch-type wearable device or an electronic device).

BACKGROUND

An electronic device may be carried by putting the device into a user's pocket, bag, and the like, holding the device by hand; or wearing the device on a predetermined position of the user's body. A wearable electronic device may refer to an electronic device that may be used by being worn on various portions of a human body.

A wearable electronic device may be worn on a human body, such as a wrist, as a type of a watch or a band. Alternatively, a wearable electronic device may be put around a human body as a type of a string or a necklace, or may be worn in a method that is similar to a method of wearing spectacles. Alternatively, a wearable device may be worn in a manner of fitting the wearable device on a part of a human body, clothing, or belongings as a type of a clip, or directly or indirectly attaching the wearable device to a part of a human body, clothing, or belongings.

A wearable device according to various embodiments may include a main body and a wearing part (e.g., a strap or a band), and may be worn on various parts of a human body according to the configuration of the wearing part. For example, a wearable device, which is worn around a wrist, may include a main body that may be worn on the wrist using a pair of straps, and a wearable device, which is worn around a neck, may include a main body that may be worn on a human body using a string put around the neck.

However, the wearable electronic devices are inconvenient in that it is impossible to confirm desired information in a display off state of the related art. For example, in the watch type wearable electronic device, there is a problem in that it is impossible to refer to the wearable electronic device for the time when the display is turned off (deactivated).

Therefore, a need exists for a watch-type wearable electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide to a watch-type wearable electronic device (which may also be referred to as a watch-type wearable device or an electronic device).

In accordance with an aspect of the present disclosure, an electronic device is provided. The electronic device includes a housing including a first face that faces in a first direction, a second face that faces in a second direction that is opposite to the first direction, and a side face that at least partially encloses a space between the first face and the second face, a transparent substrate that forms at least a portion of the first face of the housing, a display disposed within the space of the housing and exposed through at least a portion of the transparent substrate, a mechanical watch structure at least partially disposed between the transparent substrate and the display, and configured to be physically movable, at least one processor configured to control the display and the mechanical watch structure, and a memory configured to store instructions and electrically connected to the at least one processor.

In accordance with another aspect of the present disclosure, an electronic device is provided. The electronic device may include a housing including a first face that faces in a first direction, a second face that faces in a second direction that is opposite to the first direction, and a side face that at least partially encloses a space between the first face and the second face, a transparent substrate that forms at least a portion of the first face of the housing, a display disposed within the space of the housing and exposed through at least a portion of the transparent substrate, at least one physical path forming at least one closed loop along a periphery of the display, and at least one spherical structure disposed to be movable along the at least one physical path in a third direction that is perpendicular to the first and second directions, and configure to indicate a time.

Various embodiments of the present disclosure may provide a wearable device in which analog sensibility and digital sensibility are combined.

In addition, various embodiments of the present disclosure may provide a wearable device that can be variously driven in a low power condition.

In addition, various embodiments of the present disclosure may provide a wearable device that can indicate the time in an analog manner in a display off state.

In addition, various embodiments of the present disclosure may provide a wearable device that can indicate the time in a digital manner in a display on state.

In addition, various embodiments of the present disclosure may provide a wearable device that can indicate the time using a ball type object.

In addition, various embodiments of the present disclosure may provide a wearable device that can indicate the time in a bezel region using a ball type object.

Various embodiments of the present disclosure may provide a wearable device in which analog sensibility and digital sensibility are combined. For example, various embodiments of the present disclosure may indicate the time in an analog manner in a display off state, and may indicate the time in a digital manner in a display on state.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 7A, 7B, 7C, 7D, and 7E are views sequentially illustrating states of an object moved by a drive unit in a wearable device according to various embodiments of the present disclosure;

FIGS. 12A and 12B are views each indicating a moving direction using an object in a navigation mode of a wearable device according to various embodiments of the present disclosure, in which FIG. 12A illustrates a display on state and FIG. 12B illustrates a display off state;

Throughout the drawings, like reference numerals will be understood to refer to like parts, components, and structures.

DETAILED DESCRIPTION

Figure 1A:
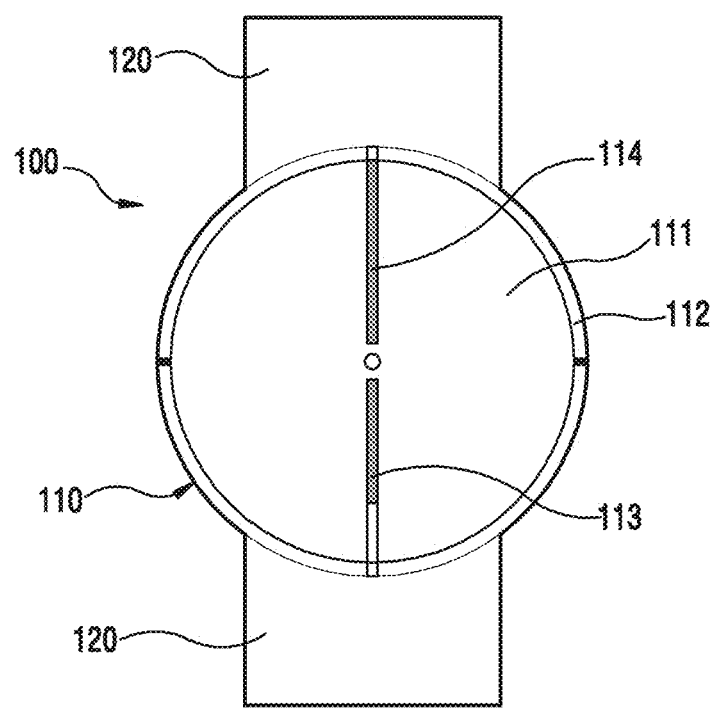
FIG. 1A is a view illustrating a wearable device in a display off state according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As used herein, the expression "have", "may have", "include", or "may include" refers to the existence of a corresponding feature (e.g., a numeral, a function, an operation, or a constituent element, such as a component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expressions, such as "first", "second", and the like, used in various embodiments of the present disclosure may modify various elements regardless of order or importance, and do not limit corresponding elements. The above-described expressions may be used to distinguish an element from another element. For example, a first user device and a second user device indicate different user devices although both of them are user devices. For example, a first element may be termed a second element, and similarly, a second element may be termed a first element without departing from the scope of the present disclosure.

It should be understood that when an element (e.g., a first element) is referred to as being (operatively or communicatively) "connected," or "coupled," to another element (e.g., a second element), it may be directly connected or coupled directly to the other element or any other element (e.g., a third element) may be interposer between them. In contrast, it may be understood that when an element (e.g., a first element) is referred to as being "directly connected," or "directly coupled" to another element (e.g., a second element), there are no element (e.g., a third element) interposed between them.

The expression "configured to" used in the present disclosure may be exchanged with, for example, "suitable for", "having the capacity to", "designed to", "adapted to", "made to", or "capable of" according to the situation. The expression "configured to" may not necessarily mean "specially designed to" in terms of hardware. Alternatively, in some situations, the expression "device configured to" may mean that the device, together with other devices or components, "is able to". For example, the phrase "processor adapted (or configured) to perform A, B, and C" may mean a dedicated processor (e.g., an embedded processor) only for performing the corresponding operations or a generic-purpose processor (e.g., a central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical terms and scientific terms, may have the same meaning as commonly understood by a person of ordinary skill in the art to which the present disclosure pertains. Terms, such as those defined in commonly used dictionaries, should be interpreted as having a meaning that is the same or similar to their meaning in the context of the relevant art and will not be interpreted in an idealized or overly formal sense unless expressly so defined herein. In some cases, even the term defined in the present disclosure should not be interpreted to exclude embodiments of the present disclosure.

Hereinafter, various embodiments of the present disclosure will be described with reference to the accompanying drawings.

FIG. 1A is a view illustrating a wearable device in a display off state according to various embodiments of the present disclosure.

Referring to FIG. 1A, an electronic device 100 according to various embodiments of the present disclosure may be a watch type wearable electronic device that may be worn around a user's wrist. Hereinafter, the watch type wearable electronic device may be referred to as a wearable device. According to various embodiments of the present disclosure, the wearable device 100 may include a main body 110, and connection parts 120 (e.g., straps or bands) mounted on the main body 110. According to various embodiments of the present disclosure, the main body 110 may include a housing (case) configured to accommodate electronic components therein while providing an external appearance. The housing may include a first face that faces in a first direction, a second face that faces in a second direction that is opposite to the first direction, and a side face that encloses a space between the first face and the second face. If the first direction and the second direction are an upward direction and a downward direction, respectively, the first face may be the top face and the second face may be the bottom face.

According to one embodiment of the present disclosure, the wearable device 100 may be worn around a wrist by winding the connection parts 120 in a state where the main body 110 is mounted on the wrist. One of the connection parts 120 may include a plurality of length adjusting openings (not illustrated) that are formed at regular intervals such that the wearing position can be adjusted to be fitted on the user's wrist. According to one embodiment of the present disclosure, the connection parts 120 may be formed of at least one of metal, leather, rubber, silicon, and urethane. The connection parts 120 may be variously implemented to be worn around a specific position of a human body (e.g., a neck, an ankle, or a wrist). The main body 110 has a cylindrical shape, and may be provided with a display 111 on the top surface so as to display various pieces of information or a user interface (UI) environment. The display 111 may be provided with a touch panel to operate as a touch screen. The display 111 may include a flat display module or a flexible display module (e.g., a curved display).

According to various embodiments of the present disclosure, the display 111 may be protected from the outside by at least a portion of a transparent substrate. For example, the transparent substrate may be a window. The transparent substrate may be at least a portion of the housing. The display 111 may be disposed in at least a partial space of the housing, and may be exposed through at least a portion of the transparent substrate.

According to various embodiments of the present disclosure, when the display is turned on (activated), various data may be displayed on a screen, and when the display is turned off (deactivated), the data may not be displayed on the screen.

According to various embodiments of the present disclosure, the wearable device 100 may include a battery (see FIG. 4) as a power supply unit.

According to various embodiments of the present disclosure, the wearable device 100 may be provided with various sensors. For example, the various sensors (not illustrated) may include at least one of a gesture sensor, a gyro sensor, an atmospheric pressure sensor, a magnetic sensor, an acceleration sensor, a proximity sensor, a color sensor, a biometric sensor, a temperature sensor, a humidity sensor, an illuminance sensor, or an ultraviolet (UV) sensor. In addition, according to one embodiment of the present disclosure, the wearable device 100 may include a rotary sensor (not illustrated), and the like, that is capable of detecting a rotated position and a rotating direction of a rotating body. Data input through the sensor according to the rotation of the rotating body may be displayed on the display 111. According to various embodiments of the present disclosure, the wearable device 100 may recognize a rotating direction, a rotating speed, a rotating amount, a rotated position, and the like, of the rotating body. Sensors for recognizing the rotation may include an optical sensor and at least one magnetic sensor.

According to various embodiments of the present disclosure, the wearable device may include a support structure in the main body 110. The rotating body may be rotatably mounted on the support structure such that the wearable device may be operated depending on whether the rotating body is rotated or not. The rotating body is an input device that may be operated in various modes according to the rotating amount or the rotating direction thereof.

The support structure may be made of an injection molded material, an alloy material, or a combination thereof in order to protect or support all the components used in the wearable electronic device.

A main home screen may be displayed on the display 111 positioned on the front face of the wearable device 100. The main home screen may be the first screen that is displayed on the display 111 when the power source of the wearable device 100 is turned on. In addition, when the wearable device 100 has several pages of different home screens, the main home screen may be the first home screen among the several pages of home screens. The home screen may display shortcut icons to execute frequently used applications, a main menu switching key, time, weather, and the like.

A main menu switching key (not illustrated) may cause a menu screen to be displayed on the display 111. The main menu switching key may be displayed on the display of the wearable device, or may be provided on the side rim of the main body in a button type to be operated by a physical pushing action. In addition, the main menu may be disposed on a portion of a strap to be used when wearing the main body on a wrist. In addition, on the display 111, status bars may be formed to indicate the statuses of the wearable device 100, such as a battery charge status, the strength of a received signal, and the current time. A home button, a menu button, and the like, may also be disposed on the display 111.

The home button may cause the display 111 to display the main home screen. For example, when the home button is touched in the state where a home screen, which is different from the main home screen, or the menu screen is displayed on the display 111, the main home screen may be displayed on the display 111. For example, the home button may be used in order to cause the display 111 to display the most recently used application or a task manager.

The menu button may provide a connection menu that may be used on the display 111. The connection menu may include, for example, a widget addition menu, a background screen change menu, a retrieve menu, an edition menu, or an environment setting menu. The back button may cause the screen, which was executed just prior to the currently executed screen, to be displayed, or may cause the most recently used application to be terminated.

A first camera (not illustrated), an illuminance sensor (not illustrated), and a proximity sensor (not illustrated) may be arranged in an edge of the wearable device 100. A biometric sensor (not illustrated) may be arranged on the rear face of the wearable device 100.

According to various embodiments of the present disclosure, the wearable device may include a display region and a non-display region on the front face thereof. The non-display region may be arranged in a ring shape that surrounds the outer periphery of the display region. For example, the non-display region may be referred to as a bezel region.

Figure 1B:
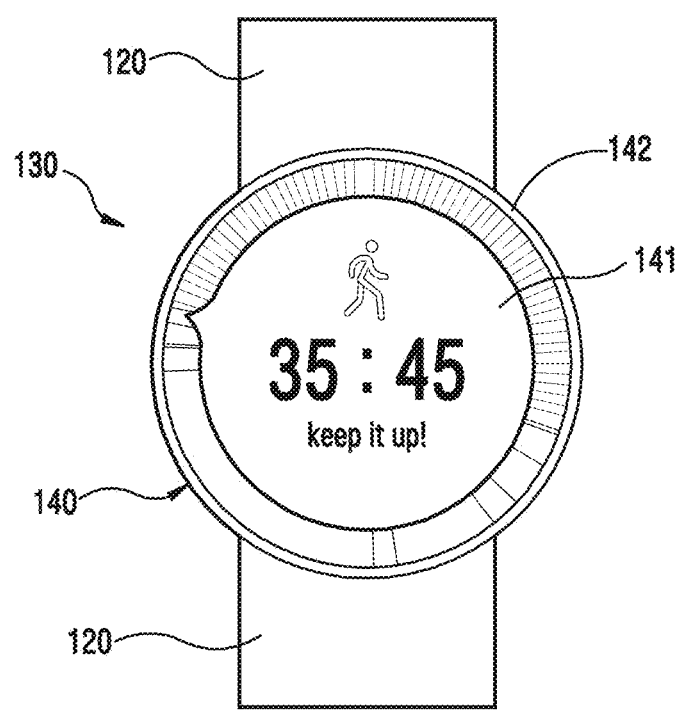
FIG. 1B is a view illustrating the wearable device in a display on state according to various embodiments of the present disclosure.
Figure 1C:
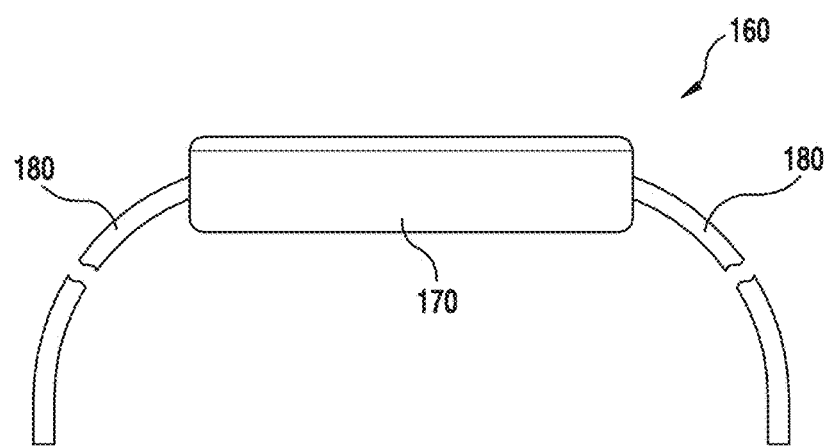
FIG. 1C is a side view illustrating a wearable device according to various embodiments of the present disclosure.

FIG. 1A illustrates the display off state of the display of the wearable device, and FIG. 1B illustrates the display on state of the display of the wearable device in which information is displayed on the display region. FIG. 1C is a view illustrating a side face of the wearable device.

Referring to FIG. 1A, according to various embodiments of the present disclosure, the wearable device 100 may include a main body 110, a display 111 disposed on the front face of the main body 110, and a mechanical watch structure configured to be physically movable and disposed between a transparent substrate (see FIG. 4) and the display 111. The mechanical watch structure may include first and second members 113 and 114. For example, each of the first and second members 113 and 114 may be formed of a shape memory alloy or may be moved by a shape memory alloy. According to various embodiments of the present disclosure, the shape memory alloy may be a member that is movable to the original position thereof by a temperature. The first member 113 may be a movable member to indicate the hour, and the second member 114 may be a movable member to indicate the minute. Hereinafter, the first member 113 to indicate the hour may be referred to as an hour hand, and the second member 114 to indicate the minute may be referred to as a minute hand.

The first member 113 and the second member 114 that forms the mechanical watch structure according to various embodiments may be configured to be movable on the display 111. For example, each of the first and second members 113 and 114 may be moved to the non-display region of the display. On the contrary, each of the first and second members 113 and 114 accommodated in the non-display region may be moved and disposed in the display region of the display 111. The force to move each of the first and second members 113 and 114 may be respectively provided by drive units, each of which includes a shape memory alloy. The detailed construction and operation of each drive unit will be described below.

In the wearable device 100 according to various embodiments of the present disclosure, the first member 113 and/or the second member 114 may be moved according to the on or off state of the display 111.

According to various embodiments of the present disclosure, the front face of the main body 110 may include the display 111 having a display region and a non-display region 112. The non-display region 112 is a deactivated region, and may be referred to as a bezel region. For example, the first member 113 and the second member 114 may be disposed in the display region in the display off state to indicate time, and may be concealed by being disposed in the non-display region 112 in the on state of the display 111. As will be described later, the first member 113 and the second member 114 may be disposed in the display 111 or the non-display region 112 by the force of the drive unit according to the display state.

FIG. 1B is a view illustrating a wearable device in a display on state according to various embodiments of the present disclosure.

Referring to FIG. 1B, the front face of the main body 140 of a wearable device 130 according to various embodiments may display various pieces of information in the state where the display 141 is turned on. According to various embodiments of the present disclosure, the display 141 may display information indicating, for example, the hour, the minute, and the second. In addition, the display 141 may display information related to a step counter. According to one embodiment of the present disclosure, a non-display region (e.g., a bezel region 142) may be disposed in the outer peripheral region of the display 141.

FIG. 1C is a side view illustrating a wearable device according to various embodiments of the present disclosure.

Referring to FIG. 1C, one or more straps 180 may be connected to the main body 170 of a wearable device 160 according to various embodiments. According to various embodiments of the present disclosure, the straps 180 may be formed of leather, metal, a soft material (e.g., rubber), and the like, and may be connected to the opposite ends of the main body 170, respectively. The straps 180, which are respectively connected to the opposite ends of the main body 170, may be coupled to each other so as to wear the main body 170 on a portion of a human body (e.g., a wrist).

FIGS. 2A, 2B, 2C, 2D, and 2E are views illustrating main bodies of wearable devices that have various displays disposed on front faces thereof, according to various embodiments of the present disclosure.

Various devices to be provided as the main body of the wearable device according to various embodiments will be described with reference to FIGS. 2A, 2B, 2C, 2D, and 2E.

Figure 2A:
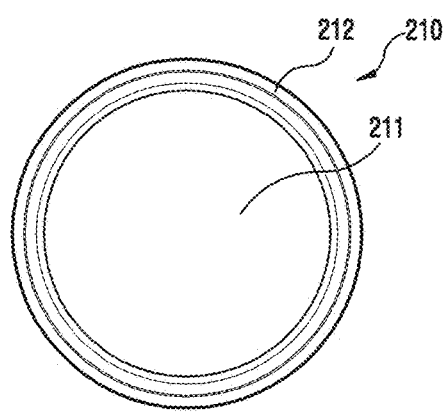
FIGS. 2A, 2B, 2C, 2D, and 2E are views illustrating main bodies of wearable devices that have various displays disposed on front faces thereof, according to various embodiments of the present disclosure.

Referring to FIG. 2A, according to various embodiments of the present disclosure, the main body 210 of the wearable device may include a display region 211 and a bezel region 212, which is a non-display region. When the wearable device is viewed from the front side, the display region 211 may have a circular shape, and the bezel region 212 may have a ring shape that surrounds the display region.

Figure 2B:
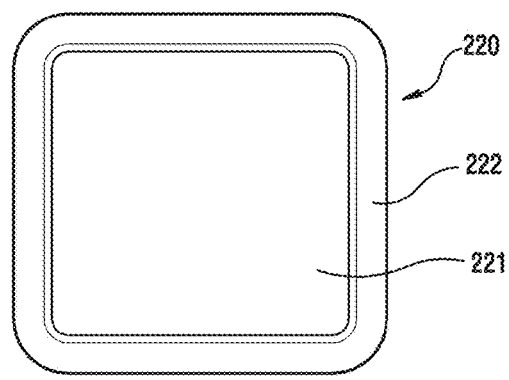

Referring to FIG. 2B, according to various embodiments of the present disclosure, the main body 220 of the wearable device may include a display region 221 and a bezel region 222, which is a non-display region. When the wearable device is viewed from the front side, the display region 221 may have a square shape, and the bezel region 222 may have a shape that surrounds the display region 221. According to various embodiments of the present disclosure, each angled region (corner) may be configured to have a curvature.

Figure 2C:
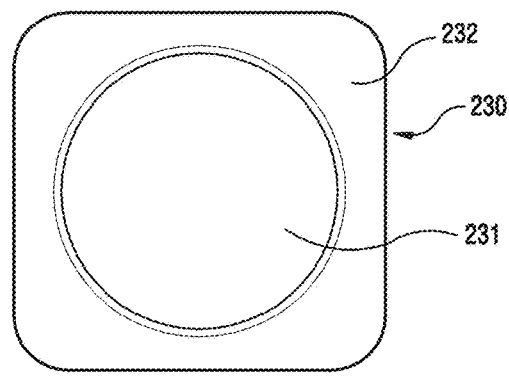

Referring to FIG. 2C, according to various embodiments of the present disclosure, the main body 230 of the wearable device may include a display region 231 and a bezel region 232, which is a non-display region. When the wearable device is viewed from the front side, the display region 231 may have a circular shape, and the bezel region 232 may have a hollow-square shape that surrounds the display region 231.

Figure 2D:
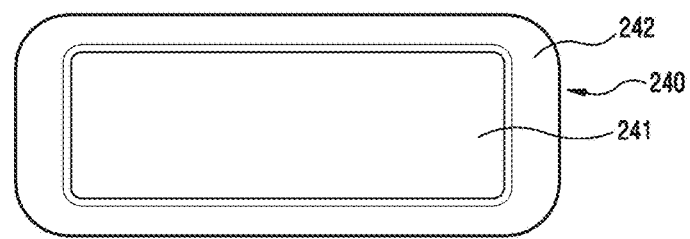

Referring to FIG. 2D, according to various embodiments of the present disclosure, the main body 240 of the wearable device may include a display region 241 and a bezel region 242, which is a non-display region. When the wearable device is viewed from the front side, the display region 241 may have a rectangular shape, and the bezel region 242 may have a shape that surrounds the display region 241. According to various embodiments of the present disclosure, each angled region (corner) may be configured to have a curvature.

Figure 2E:
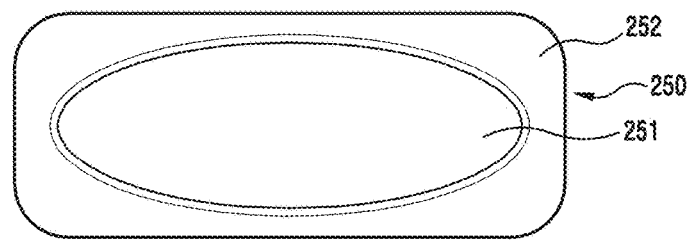

Referring to FIG. 2E, according to various embodiments of the present disclosure, the main body 250 of the wearable device may include a display region 251 and a bezel region 252, which is a non-display region. When the wearable device is viewed from the front side, the display region 251 may have an oval shape, and the bezel region 252 may have a shape that surrounds the display region 251. According to various embodiments of the present disclosure, each angled region (corner) may be configured to have a curvature.

Figure 3A:
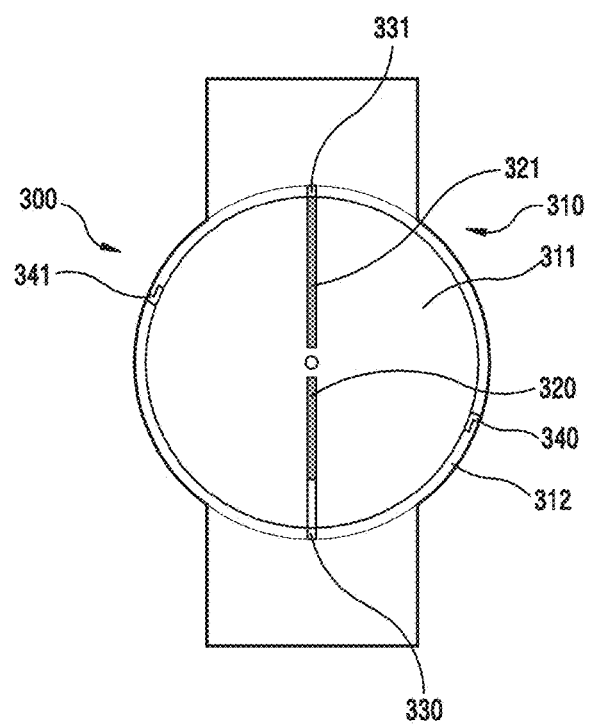
FIG. 3A is a view illustrating first and second members in a case where a wearable device is in a display off state according to various embodiments of the present disclosure.
Figure 3B:
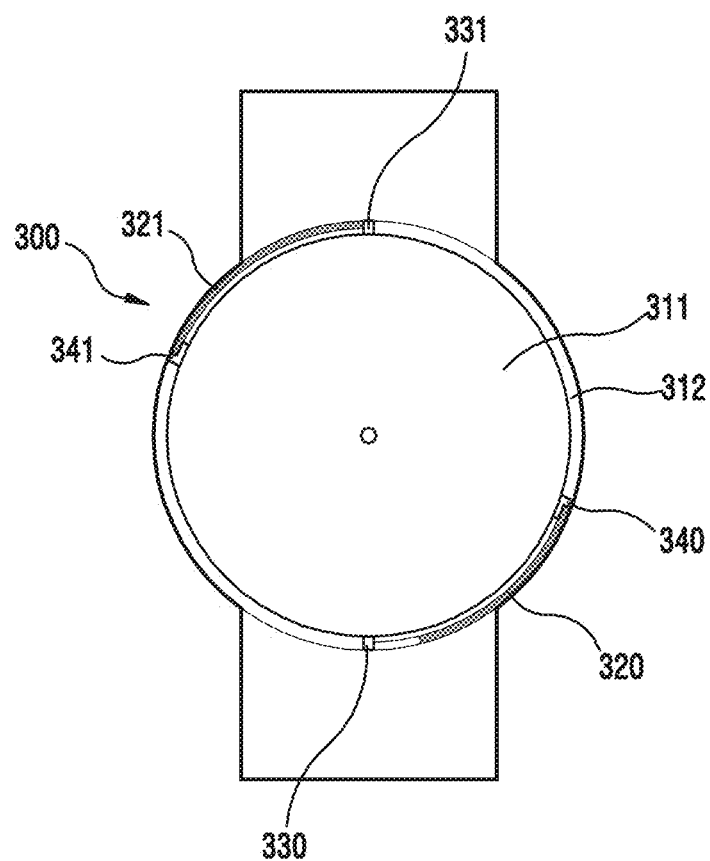
FIG. 3B is a view illustrating first and second members which have moved to a bezel region in a case where a wearable device is in a display off state according to various embodiments of the present disclosure.

FIG. 3A is a view illustrating first and second members in a case where a wearable device is in a display off state according to various embodiments of the present disclosure. FIG. 3B is a view illustrating first and second members, which have moved to a bezel region in a case where a wearable device is in a display off state according to various embodiments of the present disclosure.

Referring to FIGS. 3A and 3B, a wearable device 300 according to various embodiments may include a main body 310, a display 311, a bezel region 312, first and second members 320 and 221, and drive units 330 and 331. The wearable device 300 may be the electronic device 100 of FIGS. 1A, 1B, and 1C.

In the wearable device 300 according to various embodiments of the present disclosure, the first member 320 and/or the second member 321 may be configured to move according to the on or off state of the display 311 that is disposed on the front face of the main body 310. In the display off state, the first and second members 320 and 321 may be disposed in the display region of the display 311 so as to indicate a time. In the display on state, each of the first and second members 320 and 321 may move from the display region of the display 311 to the bezel region 312 and may be disposed to be non-visible to the user.

In the wearable device 300 according to various embodiments of the present disclosure, a processor determines whether the display is activated, and when it is determined that the display is activated (on state), the processor may cause the first member 320 and/or the second member 321 to be fixed in a first shape such that the first member 320 and the second member 321 may be disposed not to cover the display. In addition, when it is determined that the display is deactivated (off state), the processor may cause the first member 320 and/or the second member 321 to be fixed in a second shape, thereby indicating a time.

In the wearable device 300 according to various embodiments of the present disclosure, a processor determines whether the display is activated, and when it is determined that the display is activated, the processor may cause the first member 320 and/or the second member 321 to be fixed in the first shape such that a second end of the first member 320 and a second end of the second member 321 may be adjacent to each other in the central portion of the display, thereby not covering the display. In addition, when the display is deactivated, the processor may cause the first member 320 and/or the second member 321 to be fixed in the second shape such that the second end of the first member 320 and the second end of the second member 321 may be in contact with the inner side face of the housing, thereby indicating a time. For example, according to various embodiments of the present disclosure, each of the first and second members 320 and 321 may be coupled to a shape memory alloy and a resistor, and when power is applied to each resistor to generate heat, each shape memory alloy is returned to the original position thereof by the radiation of the heat transferred thereto, which may also move the first and second members 320 and 321, which are connected to the first and second members 320 and 321, respectively. The detailed descriptions of the moving operations of the first and second members 320 and 321 (the operations of the shape memory alloys and resistors) will be made later with reference to FIGS. 3C and 3D.

According to various embodiments of the present disclosure, the drive units 330 and 331 may be disposed in the bezel region 312 as drive sources that provide a force to move the first and second members 320 and 321, respectively. According to various embodiments of the present disclosure, the drive units may include a first drive unit 330 configured to move the first member 320 and a second drive unit 331 configured to move the second member 321.

As will be described below, the first and second drive units 330 and 331 are capable of providing a force to move the first and second members 320 and 321 due to the bonding of a shape memory alloy and a resistor (see FIGS. 3C and 3D.

According to various embodiments of the present disclosure, the first drive unit 330 may be disposed in the bezel region 312 and one end of the first member 320 may be fixed to the first drive unit 330. In the display off state, the first member 320 may be disposed in a first shape (linear shape) in the display region of the display 311 so as to indicate the hour. In the display on state, the first member 320 may be moved to the bezel region 312 by the first drive unit 330 (e.g., by the deformation of the shape memory alloy due to, for example, the heat generation of the resistor), and may be disposed in the bezel region 312. The first member 320 may be accommodated in a second shape along the bezel region 312 due to the deformation of the shape memory alloy. The first member 320 may be prevented from being floated in the bezel region 312 by a first fixing part 340.

According to various embodiments of the present disclosure, the second drive unit 331 may be disposed in the bezel region 312, and one end of the second member 321 may be fixed to the second drive unit 331. In the display off state, the second member 321 may be disposed in a first shape (linear shape) in the display region of the display 311 so as to indicate the minute. In the display on state, the second member 321 may be moved to the bezel region 312 by the second drive unit 331 (i.e., by the deformation of the shape memory alloy due to the heat generation of the resistor), and may be disposed in the bezel region 312. The second member 321 may be accommodated in a second shape (a curved shape or a shape having a curvature) along the bezel region 312 due to the deformation of the shape memory alloy. The second member 321 may be prevented from being floated in the bezel region 312 by a second fixing part 341.

When the display is turned on again, each of the first and second members 320 and 321 may be returned to the first shape as each shape memory alloy is returned to the original shape thereof.

According to various embodiments of the present disclosure, the first member 320 may include a first end face configured to be in contact with a portion of the inner side face of the housing and to be movable along the inner side face, and a second end face that is opposite to the first end face. According to various embodiments of the present disclosure, the second member 321 may include a first end face configured to be in contact with another portion of the inner side face of the housing and to be movable along the inner side face independently from the first member 320, and a second end face that is opposite to the first end face.

In addition, according to various embodiments of the present disclosure, at least a portion of the first member 320 may be covered with a first color substance, and at least a portion of the second member 321 may be covered with a second color substance. In addition, the length of the region covered with the first color substance in the first member 320 may be shorter than the region covered with the second color substance in the second member 321.

According to various embodiments of the present disclosure, in order to make a short portion in the first member 320 to be seen as an hour hand, another material, such as a transparent material may be attached to a remaining portion except for the short portion or the remaining portion may be covered with another color.

According to various embodiments of the present disclosure, the wearable device 300 may include a first fixing part 340 configured to fix the state of the first member 320 after the first member 320 is moved to the bezel region 312. For example, the wearable device 300 may further include a first fixing part 340 configured to fix the second end face of the first member 320 to the inner side face of the housing, and to move along the inner side face. According to various embodiments of the present disclosure, the wearable device 300 may include a second fixing part 341 configured to fix the state of the second member 321 after the second member 321 is moved to the bezel region 312. For example, the wearable device 300 may further include a second fixing part 341 configured to fix the second end face of the second member 321 to the inner side face of the housing, and to move along the inner side face.

Figure 3C:
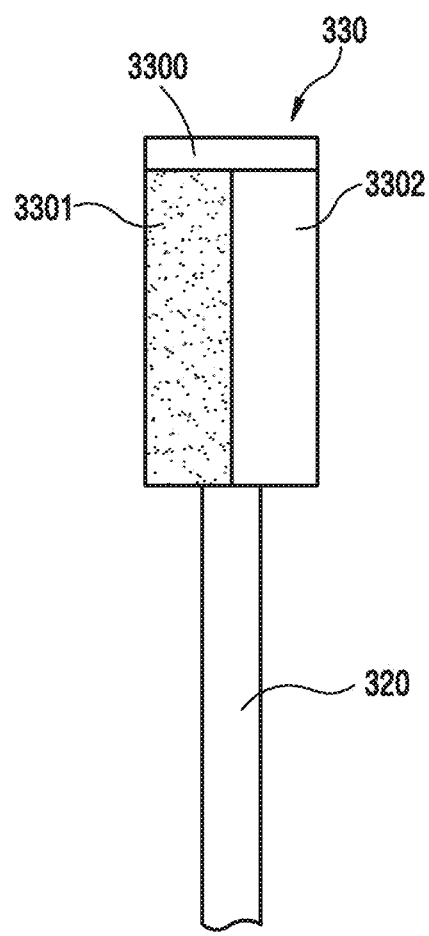
FIGS. 3C and 3D are views illustrating states of a drive unit before and after moving first and second members in a wearable device according to various embodiments of the present disclosure.
Figure 3D:
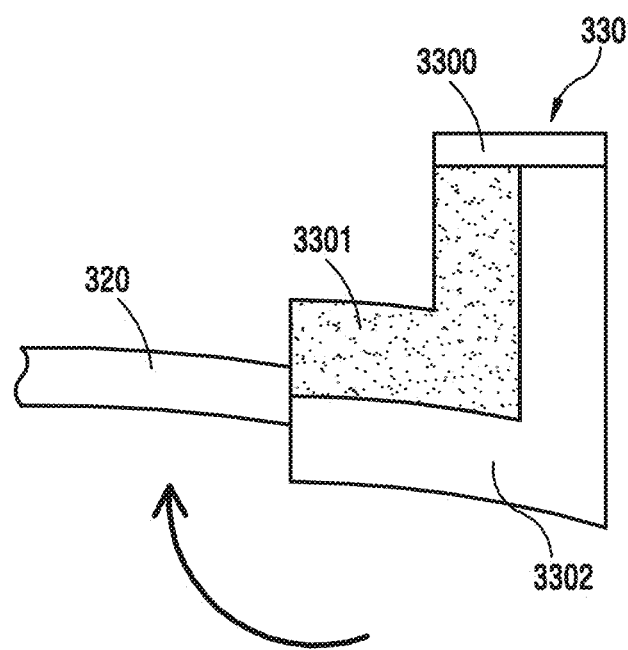

FIGS. 3C and 3D are views illustrating the states of a drive unit before and after moving the first and second members in the wearable device according to various embodiments of the present disclosure.

Referring to FIGS. 3C and 3D, according to various embodiments of the present disclosure, the drive units may include first and second drive units 330 and 331. The first and second drive units 330 and 331 may have the same configuration, and thus, the first drive unit 330 will be representatively described.

According to various embodiments of the present disclosure, the first drive unit 330 may include a first driving portion 3300, a shape memory alloy (hereinafter, referred to as an alloy) 3301, and a resistor 3302. The first drive unit 330 may be formed in a configuration in which the first driving portion 3300, the alloy 3301, and the resistor 3302 are bonded to each other. The resistor 3302 may be bonded to the alloy 3301. The alloy 3301 may be deformed between the original shape and a subsequent shape depending on a temperature. The original shape of the alloy 3301 may be the shape illustrated in FIG. 3C, and the subsequent shape may be the shape illustrated in FIG. 3D. The resistor 3302 may be a heat generating member, which generates heat so that the temperature thereof is raised when power is applied thereto. When the resistor 3302 generates heat, the alloy 3301 is deformed, and the deformation may cause the first member 320 and/or the second member 321 to move.

In the state of FIG. 3C, when power is applied to the resistor 3302, the resistor 3302 generates heat, and the alloy 3301 bonded to the resistor 3302 may be deformed. The first member 320 or the second member 321 (see FIG. 3B) may be moved by the deformation of the alloy 3301. The state of FIG. 3C may correspond to the states of the first member and/or the second member illustrated in FIG. 3A, and the state FIG. 3D may correspond to the states of the first and/or the second member illustrated in FIG. 3B.

Figure 4A:
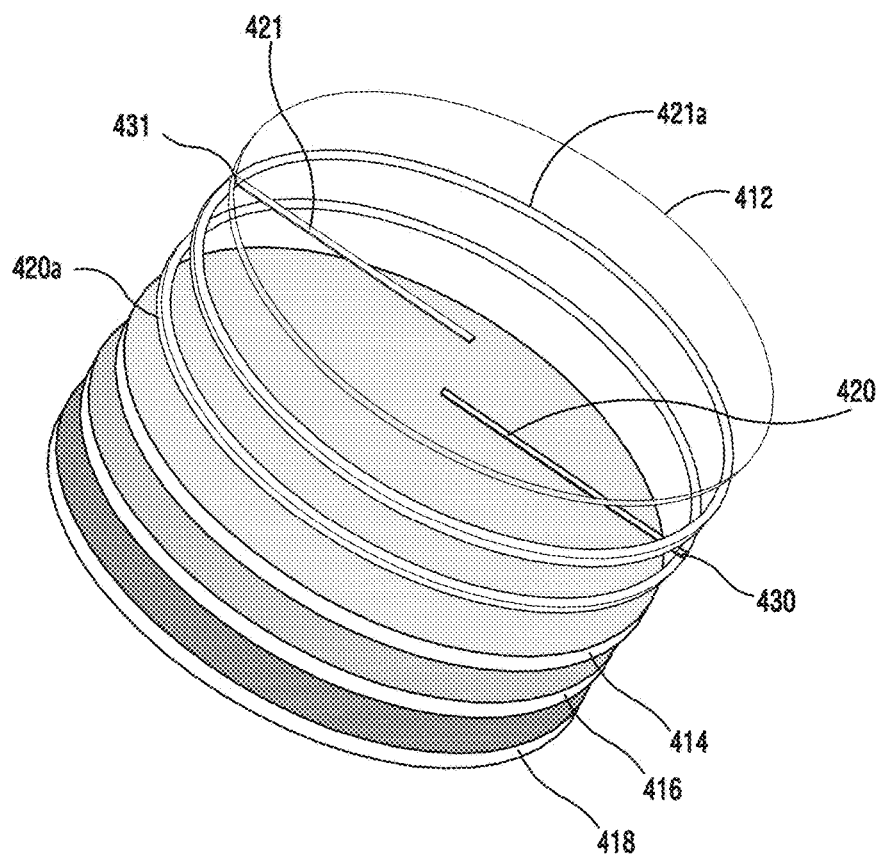
FIG. 4A is a perspective view schematically illustrating an interior configuration of a main body of a wearable device according to various embodiments of the present disclosure.
Figure 4B:
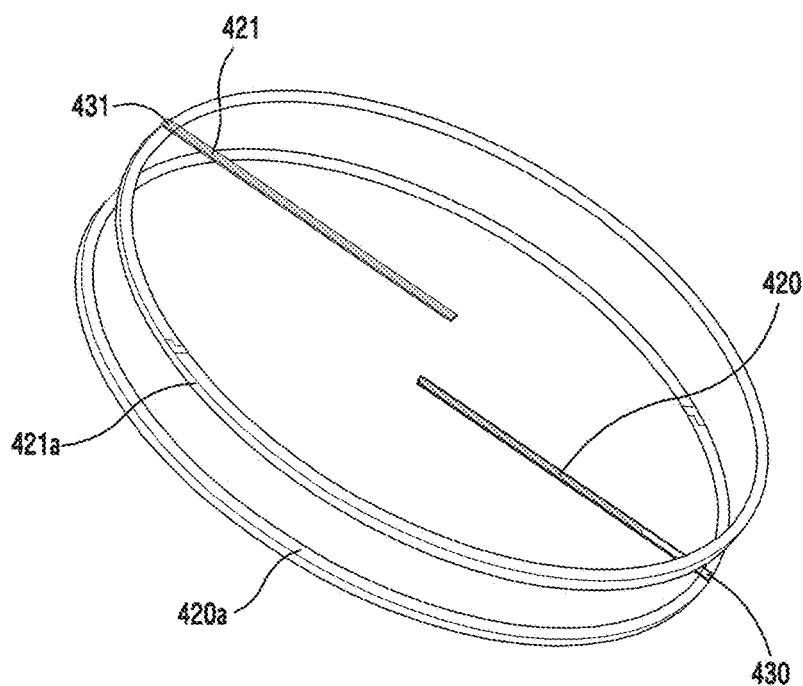
FIG. 4B is a perspective view schematically illustrating an interior configuration of a main body of an electronic device according to various embodiments of the present disclosure.

FIG. 4A is a perspective view schematically illustrating an interior configuration of a main body of a wearable device according to various embodiments of the present disclosure. FIG. 4B is a perspective view schematically illustrating an interior configuration of a main body of a wearable device according to various embodiments of the present disclosure.

Figure 4C:
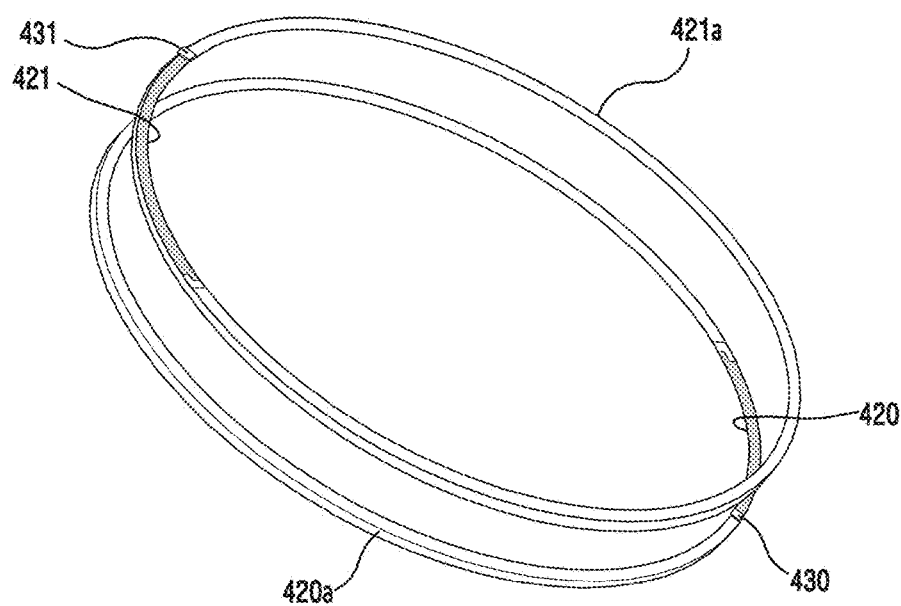
FIG. 4C is a perspective view illustrating the first and second members in a case where a wearable device is in a display off state according to various embodiments of the present disclosure.

FIG. 4C is a perspective view illustrating first and second members in a case where a wearable device is in a display off state according to various embodiments of the present disclosure.

Hereinafter, a configuration of a main body 410 of a wearable device 400 according to various embodiments of the present disclosure will be described with reference to FIGS. 4A, 4B, and 4C. The wearable device 400 according to various embodiments may be a device that is at least partially the same as the wearable device 100 illustrated in FIG. 1A. The wearable device 400 according to various embodiments may be a device that is at least partially the same as the wearable device 300 illustrated in FIG. 3A.

According to various embodiments of the present disclosure, the main body 410 of the wearable device 400 may include a housing 401, a window 412, a display 414, a board including a control unit 416, and a battery 418.

According to various embodiments of the present disclosure, the main body 410 may form an external appearance by the window 412 and the housing 401. The window 412 may be formed of glass, a transparent plastic material, and the like.

According to various embodiments of the present disclosure, the control unit 416 may be mounted on the board so as to control the operations of the display 414 and the first and second drive units 430 and 431. When the display 414 is in the on state, the control unit 416 may operate each of the resistors of the first and second drive units 430 and 431 so as to control the moving operations of the first and second members 420 and 421. According to various embodiments of the present disclosure, the first and second members 420 and 421 may be mounted between the window 412 and the display 414 such that each of the first and second members 420 and 421 is movable in the space between the window 412 and the display 414, and the first and second drive units 430 and 431 may provide a force to move the first member and/or the second member. The display 414 may be provided with a touch panel to operate as a touch screen.

According to various embodiments of the present disclosure, the first member 420 may move along a first rail 420a so as to indicate the hour. The first rail 420a may have a ring shape. According to various embodiments of the present disclosure, the second member 421 may move along a second rail 421a so as to indicate the minute. The second rail 421a may have a ring shape. According to various embodiments of the present disclosure, the first and second rails 420a and 421a may be first and second bezel regions, respectively. For example, the first and second rails 420a and 421a may be rotatably driven and controlled by a drive device (not illustrated), such as a motor. According to various embodiments of the present disclosure, when the display is activated (on state), the first member 420 and/or the second member 421 may be fixed in a first shape (the state illustrated in FIG. 4C), thereby causing the first member 320 and the second member 321 not to cover the display. In addition, when the display is deactivated (off state), the first member 420 and/or the second member 421 may be fixed in a second shape (the state illustrated in FIG. 4B), thereby indicating a time.

For example, according to various embodiments of the present disclosure, the first and second members 420 and 421 may be deformed by a force provided by the first and second drive units 430 and 431 that are mounted on the first and second rails 420a and 421a, respectively. According to various embodiments of the present disclosure, in the first and second drive units 430 and 431, each of which includes a shape memory alloy and a resistor, when power is applied to each resistor to generate heat, each shape memory alloy is returned to the original position thereof as the heat transferred thereto is radiated, which may cause the first and second members 420 and 421, which are respectively connected to the shape memory alloys, to move to the first and second rails 420a and 421a, respectively. The detailed descriptions corresponding to the moving operations of the first and second members 420 and 421 (the operations of the shape memory alloys and resistors) have already been made above with reference to FIG. 3B, and are thus omitted.

Figure 4D:
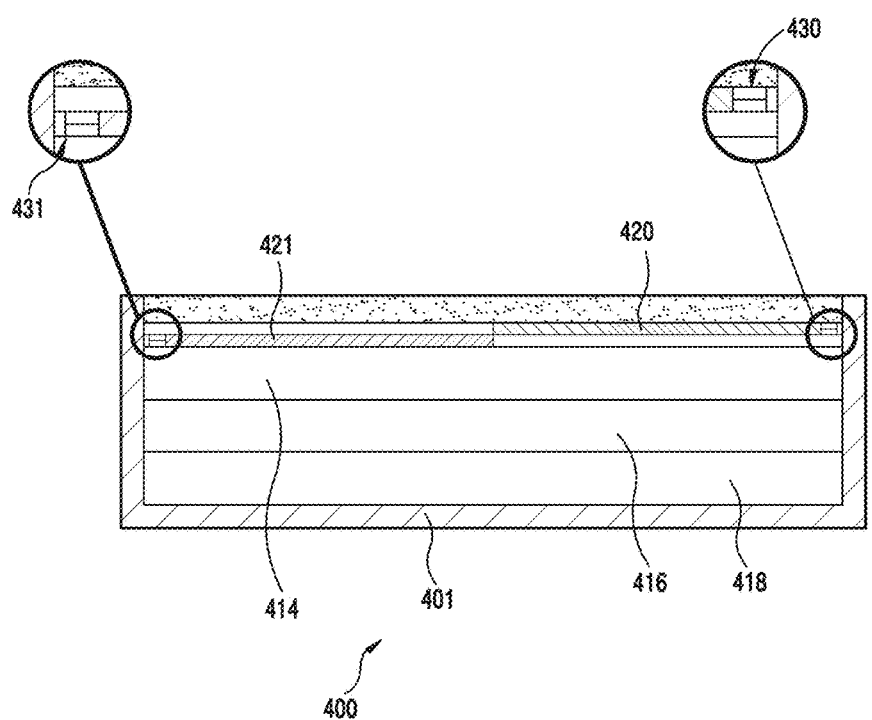
FIG. 4D is a sectional view illustrating first and second members moved to a bezel region when a wearable device is in a display on state according to various embodiments of the present disclosure.

FIG. 4D is a sectional view illustrating first and second members moved to a bezel region when a wearable device is in a display on state according to various embodiments of the present disclosure.

Referring to FIG. 4D, a wearable device 4000 according to various embodiments may be a device that is at least partially the same as the wearable device 100 illustrated in FIG. 1A. The wearable device 4000 according to various embodiments may be a device that is at least partially the same as the wearable device 300 illustrated in FIG. 3A. The wearable device 4000 according to various embodiments may be a device that is at least partially the same as the wearable device 400 illustrated in FIG. 4A.

According to various embodiments of the present disclosure, the housing 4010 is a case that accommodates and protects the display 4140, the control unit 4160, and the battery 4180, and forms an external appearance. The housing 4010 may be formed of a synthetic resin, a metal, or a combination thereof. At least a portion or the whole of the housing 4010 is formed of a metallic material, a plurality of split external metal frames that form at least a portion of the housing 4010, or a portion of the rim of the housing 4010 may also serve as antenna radiators.

According to various embodiments of the present disclosure, the display 4140 may be formed to be flat or to be curved. When the display 4140 is formed to be curved, the whole or a portion of the display 4140 may be formed to have a curvature. The region having a curvature may be an edge region of the display 4140. The first and second members 4200 and 4210 may be disposed on the display 4140 and may be configured to be movable.

According to various embodiments of the present disclosure, the first and second members 4200 and 4210 may be disposed not to overlap with each other when viewed from an end. The first member 4200 may be disposed above the second member 4210.

According to various embodiments of the present disclosure, the first drive unit 4300 may be disposed along a face that is the same as the first member 4200, and the second drive unit 4310 may be disposed along a face that is the same as the second member 4210.

Figure 5:
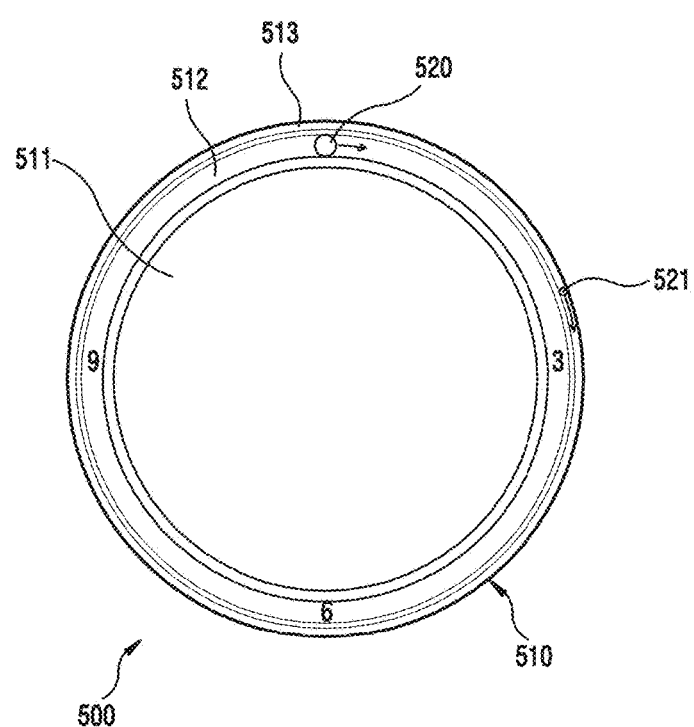
FIG. 5 is a front view illustrating a front face of a wearable device according to various embodiments of the present disclosure.

FIG. 5 is a front view illustrating a front face of a wearable device according to various embodiments of the present disclosure.

Hereinafter, a configuration of a wearable device 500 according to various embodiments of the present disclosure will be described with reference to FIG. 5.

Referring to FIG. 5, the wearable device 500 according to various embodiments may be different from the wearable device 300 illustrated in FIGS. 3A, 3B, and 3C in that the first and second members (spherical objects) indicating hour and minute have a ball (ball bearing shape) made of a metallic material, rather than having a watch hand shape, and the configuration of driving the first and second members may be different from that of the wearable device 300.

According to various embodiments of the present disclosure, the wearable device 500 may include a main body 510, a display having a display region 511 disposed on the front face of the main body 510, a first bezel region 512, a second bezel region 513, a first spherical object 520 indicating hour, a second spherical object 521 indicating minute, and a drive unit (see FIG. 6A) configured to provide a force to move the first and second spherical objects 520 and 521. Alternatively, the first spherical object 520 may indicate the minute, and the second spherical object 521 may indicate the hour. The detailed configuration of the drive unit will be described with reference to FIG. 7.

In the wearable device 500 according to various embodiments of the present disclosure, the first spherical object 520 indicating hour and the second object 521 indicating minute may be configured to be individually movable according to the display on state or display off state. In the display off state, the first and second spherical objects 520 and 521 may be disposed in the first and second bezel regions 512 and 513, respectively, so as to indicate the hour and the minute visually or tactually.

In the display on state, the first and second spherical objects 520 and 521 may be disposed in the first and second bezel regions 512 and 513, respectively, to be concealed within the first and second bezel regions 512 and 513 to be non-visible to the user. The first and second regions 512 and 513 are disposed separately, and the operations of the first and second regions 512 and 513 to be controlled by drive units (see FIG. 6A), respectively.

According to various embodiments of the present disclosure, the wearable device 500 may include a display, a processor electrically connected to at least one electromagnet, and a memory. The memory may store instructions that, when executed, cause the processor to move at least one drive unit along at least one physical path based on at least one action executed in the device.

According to various embodiments of the present disclosure, the electronic device 500 may include the first bezel region 512 as a first physical path, and the second bezel region 513 as a second physical region. The first bezel region 512 may provide a first physical path (track) in a closed loop shape along the periphery of the display having a display region 511, and the second bezel region 513 may provide a second physical path (track) extending outside the periphery of the first bezel region 512.

According to various embodiments of the present disclosure, the first spherical object 520 may be disposed to move along the first physical path, and the second spherical object 521 may be disposed to move along the second physical path.

According to various embodiments of the present disclosure, the first and second spherical objects 520 and 521 may receive a force to move along the first and second physical paths from the first and second drive units, respectively. As will be described later, each of the first and second drive units may employ an electromagnet. The first and second drive units may be disposed to be movable along the first and second physical paths, respectively.

According to various embodiments of the present disclosure, the wearable device may include a processor. The instructions to be executed by the processor may move a first electromagnet to be adjacent to a first position on the first physical path, which corresponds to hour of a selected time, and may move a second electromagnet to be adjacent to a second position on the second physical path, which corresponds to the minute of the selected time.

Figure 6A:
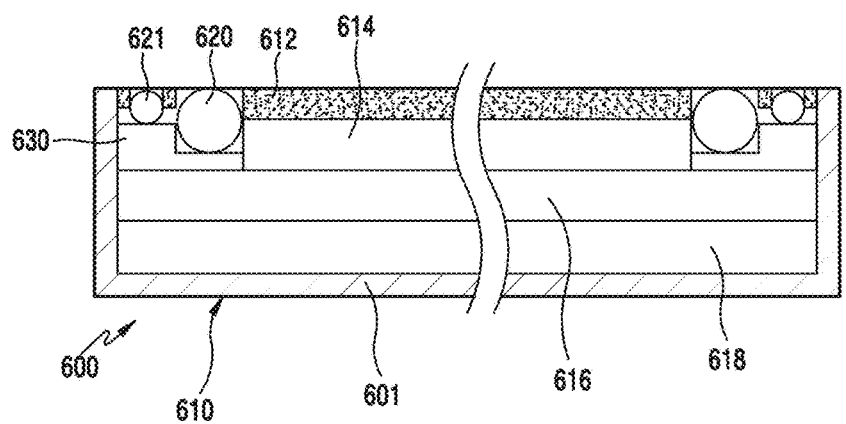
FIG. 6A is a sectional view schematically illustrating an interior configuration of a main body of a wearable device according to various embodiments of the present disclosure.
Figure 6B:
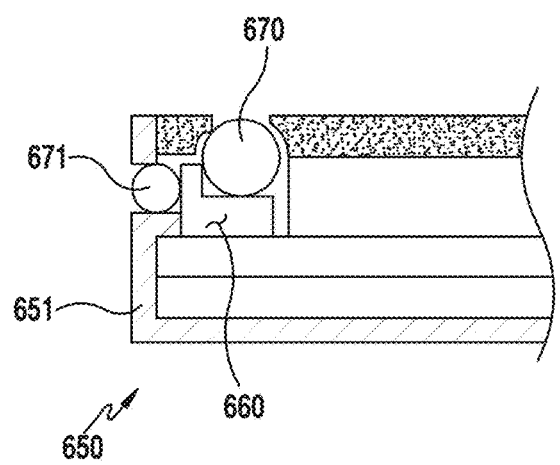
FIG. 6B is a sectional view schematically illustrating an interior configuration of a main body of a wearable device according to various embodiments of the present disclosure.

FIGS. 6A and 6B are sectional views each schematically illustrating an interior configuration of a main body of a wearable device according to various embodiments of the present disclosure.

Referring to FIG. 6A, according to various embodiments of the present disclosure, the main body 610 of a wearable device 600 may include a housing 601, a window 612, a display 614, first and second spherical objects 620 and 621, a board including a control unit 616, and a battery 618.

According to various embodiments of the present disclosure, the main body 610 may form an external appearance by the window 612 and the housing 601. The window 612 may be formed of a transparent substrate, such as a glass or a transparent plastic material.

According to various embodiments of the present disclosure, the housing 601 is a case that accommodates and protects the display 614, the first and second spherical objects 620 and 621, the drive unit 630, the control unit 616, and the battery 618, and forms an external appearance. The housing 601 may be formed of a synthetic resin, a metal, or a combination thereof. When at least a portion or the whole of the housing 601 is formed of a metallic material, a plurality of split external metal frames that form at least a portion of the housing 601 or a portion of the rim of the housing 601 may also serve as antenna radiators.

According to various embodiments of the present disclosure, the display 614 may be formed to be flat or to be curved. When the display 614 is formed to be curved, the whole or a portion of the display 4140 may be formed to have a curvature. The region having a curvature may be an edge region of the display 614. The first and second spherical objects 620 and 621 may be disposed on the display 614 such that each of the first and second spherical objects 620 and 621 is movable by the drive unit.

According to various embodiments of the present disclosure, the control unit (processor) 616 may be mounted on the board so as to control the operations of the display 614 and the drive unit 630. According to various embodiments of the present disclosure, the first and second spherical objects 620 and 621 may be mounted between the window 612 and the display 614 such that each of the first and second spherical objects 620 and 621 is movable in the space between the window 612 and the display 614, and the drive unit 630 may provide a force to move the first and second spherical objects. The display 614 may be provided with a touch panel to operate as a touch screen. The drive unit 630 may adopt a magnet, an electromagnet, or a combination thereof. The drive unit 630 may include first and second electromagnets configured to the first and second spherical objects 620 and 621, respectively.

According to various embodiments of the present disclosure, the first spherical object 620 may be disposed on the front face of the main body, and may be moved as a ball bearing type considering the first bezel region as a track by a force provided from the drive unit 630. The first spherical object 620 may indicate the hour. According to various embodiments of the present disclosure, the second spherical object 621 may be disposed on the front face of the main body, and may be moved as a ball bearing type considering the second bezel region as a track by a force provided from the drive unit 630. The second spherical object 621 is configured to have a diameter smaller than that of the first spherical object 620 and may roll along the track on the drive unit so as to indicate the minute.

Referring to FIG. 6B, a wearable device 650 of according to various embodiments may be the wearable device illustrated in FIG. 6A. In the wearable device 650 according to various embodiments of the present disclosure, the second spherical object 671 may be exposed to the side face of the case 651. The second spherical object 671 disposed on the side face of the case 651 is movable by the drive unit 660. The first spherical object 670 may be disposed on the front face of the case 651.

Figure 6C:
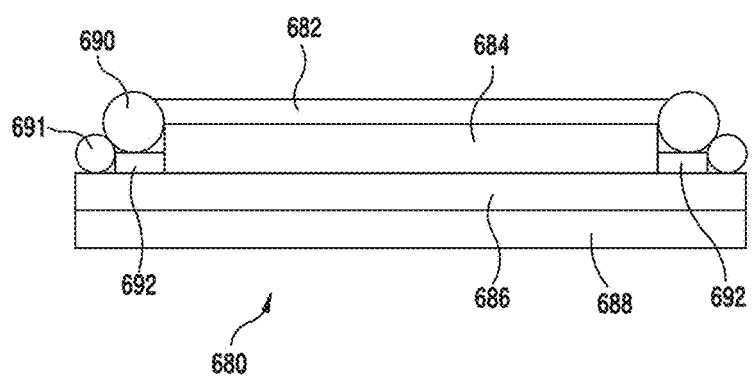
FIG. 6C is a sectional view schematically illustrating an interior configuration of a main body of a wearable device according to various embodiments of the present disclosure.

FIG. 6C is a sectional view schematically illustrating an interior configuration of a main body of a wearable device according to various embodiments of the present disclosure.

Referring to FIG. 6C, according to various embodiments of the present disclosure, a wearable device 680 may include a window 682, a display 684, first and second spherical objects 690 and 691, a drive unit 692, a board including a control unit 686, and a battery 688.

According to various embodiments of the present disclosure, the first and second spherical objects 690 and 691, which inform of the hour and the minute, respectively, may be mounted in a laminated structure. According to various embodiments of the present disclosure, the first spherical object 690 may be mounted above the second spherical object 691. According to various embodiments of the present disclosure, the first spherical object 690 may be mounted outside the second spherical object 691. According to various embodiments of the present disclosure, the first and second spherical objects 690 and 691 may be mounted side by side along an inclined direction.

FIGS. 7A to 7E are views sequentially illustrating states of an object moved by a drive unit in a wearable device according to various embodiments of the present disclosure.

Referring to FIGS. 7A to 7E, in the wearable device a spherical object may move according to the movement of a drive unit. For example, because a first electromagnet moving along a first bezel region (first physical path) and a second electromagnet moving along a second bezel region (second physical path) are equal to each other in principle, only the operation of the first electromagnet moving along the first physical path will be described.

According to various embodiments of the present disclosure, when the first electromagnet 730 sequentially moves along the first path 712, a first spherical object 720 may also sequentially move. The first path 712 may be configured using split tracks (concave and convex shapes 714 and 715) at regular intervals. The first electromagnet 730 may move along the first path 712 by a motor (not illustrated), and the like.

When a time changes so that the hour hand or the minute hand moves, the electromagnet 730 moves first ((a)→(b)), and then the first spherical object 720 moves by the magnetic force generated by the electromagnet 730 ((a)→(b)→(c)). When the first spherical object completely moves to a seat portion, the magnetic force may disappear from the electromagnet. The first spherical object 720 may move by rolling along the concave and convex shapes 714 and 715 on the tracks. When the first object 720 is seated in a recess-like portion, the first spherical object 720 may indicate the hour of a time.

Figure 8:
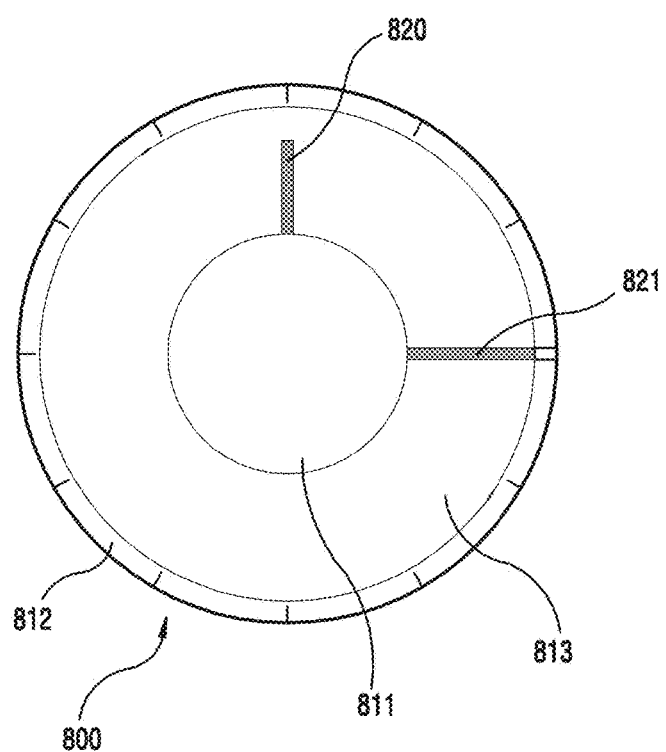
FIG. 8 is a view illustrating first and second members in a case where a wearable device is in a display off state according to various embodiments of the present disclosure.

FIG. 8 is a view illustrating first and second members of a wearable device is in a display off state according to various embodiments of the present disclosure.

Referring to FIG. 8, a wearable device 800 may include a main body 810, a display region 811, a bezel region 812, a non-display region 813, and first and second members 820 and 821.

According to various embodiments of the present disclosure, the wearable device 800 may be different from the wearable device 300 illustrated in FIGS. 3A and 3B in terms of the display region and the lengths of the first and second members.

According to various embodiments of the present disclosure, the wearable device 800 may have a circular front face when viewed from above. The front face of the main body of the wearable device 800 may include a circular display region 811 disposed in the central portion, a bezel region 812 disposed to be spaced from the display region 811 and to be concentric to the display region 811, and a non-display region 813 disposed between the display region 811 and the bezel region 812.

According to various embodiments of the present disclosure, the non-display region 813 may be a region in which the first member 820 and the second member 821 are disposed at the time of display on/off so as to indicate the hour and the minute, respectively. Meanwhile, the non-display region 813 may be a region that indicates the hour and the minute (see FIGS. 16A and 16B) together with the display region 811 at the time of display on.

The non-display region 813 may have a ring shape, and may be disposed between the display region 811 and the bezel region 812. Except for the first member 820 and the second member 821, the non-display region 813 may be formed as an empty space, and may be a region that is visible from the outside. The non-display region 813 may be disposed to enclose the display region 811.

According to various embodiments of the present disclosure, the bezel region 812 may be a non-display region, but may be a region that is not visible from the outside.

According to various embodiments of the present disclosure, the shapes of the display region 811, the non-display region 813, and the bezel region 812 need not be limited. The various display regions and non-display regions illustrated in FIGS. 2A, 2B, 2C, 2D, and 2E may be applied.

Figure 9:
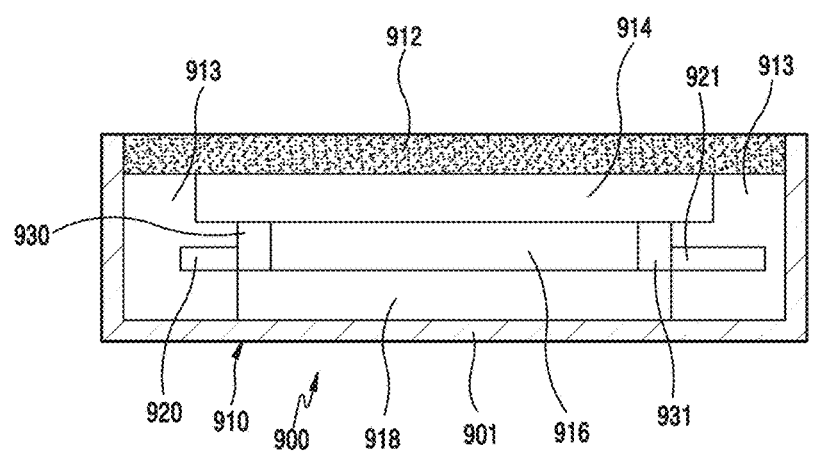
FIG. 9 is a sectional view schematically illustrating an interior configuration of a main body of a wearable device according to various embodiments of the present disclosure.

FIG. 9 is a sectional view schematically illustrating an interior configuration of a main body of a wearable device according to various embodiments of the present disclosure.

Referring to FIG. 9, a vertical laminated structure of a main body 910 of a wearable device 900 according to various embodiments of the present disclosure will be described with reference to FIG. 9. The wearable device illustrated in FIG. 9 may be the same as the wearable device 800 illustrated in FIG. 8.

According to various embodiments of the present disclosure, the main body 910 of the wearable device 900 may include a housing 901, a window 912, a display 914, a board including a control unit 916, and a battery 918.

According to various embodiments of the present disclosure, the main body 910 may form an external appearance by the window 912 and the housing 901. The window 912 may be formed of glass, a transparent plastic material, and the like.

According to various embodiments of the present disclosure, the housing 901 is a case that accommodates and protects the display 914, the control unit 916, and the battery 918 and forms an external appearance. The housing 901 may be formed of a synthetic resin, a metal, or a combination thereof. When at least a portion or the whole of the housing 901 is formed of a metallic material, a plurality of split external metal frames that form at least a portion of the housing 901 or a portion of the rim of the housing 901 may also serve as antenna radiators.

According to various embodiments of the present disclosure, the display 914 may be formed to be flat or to be curved. When the display 914 is formed to be curved, the whole or a portion of the display 914 may be formed to have a curvature. The region having a curvature may be an edge region of the display 914.

According to various embodiments of the present disclosure, the display region of the display 914 may be configured to be the same as the display region illustrated in FIG. 8. A non-display region 913 may be disposed between the housing 901 and the display 914.

According to various embodiments of the present disclosure, a first member 920 and a second member 921 may be disposed side by side, rather than being laminated with the display 914. For example, the first member 920 and the second member 921 may be disposed parallel to each other, rather than being laminated with the display 914 so as to indicate the hour and the minute, respectively. In addition, according to various embodiments of the present disclosure, each of the first and second members 920 and 921 may be disposed below the display 914 to be concealed by the display 914 below the display 914 when viewed from the outside.

According to various embodiments of the present disclosure, the first and second members 920 and 921 may indicate an hour hand and a minute hand in the non-display region 913 by the first and second drive units 930 and 931, respectively, or may be disposed below the display 914 to be concealed.

According to various embodiments of the present disclosure, the first and second drive units 930 and 931 may be disposed on a board to be controlled by a control unit. Each of the first and second drive units 930 and 931 may be disposed below the display 914 so as to provide a force to move each of the first and second members 920 and 921. The configurations and operations corresponding to the first and second drive units 930 and 931 according to various embodiments have been described with reference to FIG. 3C, the detailed descriptions of the configurations and operations of the first and second drive units 930 and 931 will be omitted.

According to various embodiments of the present disclosure, the control unit 916 may be mounted on the board so as to control the operations of the display 914 and the first and second drive units 930 and 931. When the display 914 is in the on state, the control unit 916 may operate each of the resistors of the first and second drive units 930 and 931 so as to control the moving operations of the first and second members 920 and 921.

Operations that may be input using a wearable device according to various embodiments will be described with reference to FIGS. 10A, 10B, 11A, 11B, 12A, 12B, 13A, 13B, and 13C, 14A, 14B, 15, 16A, and 16B.

Figure 10A:
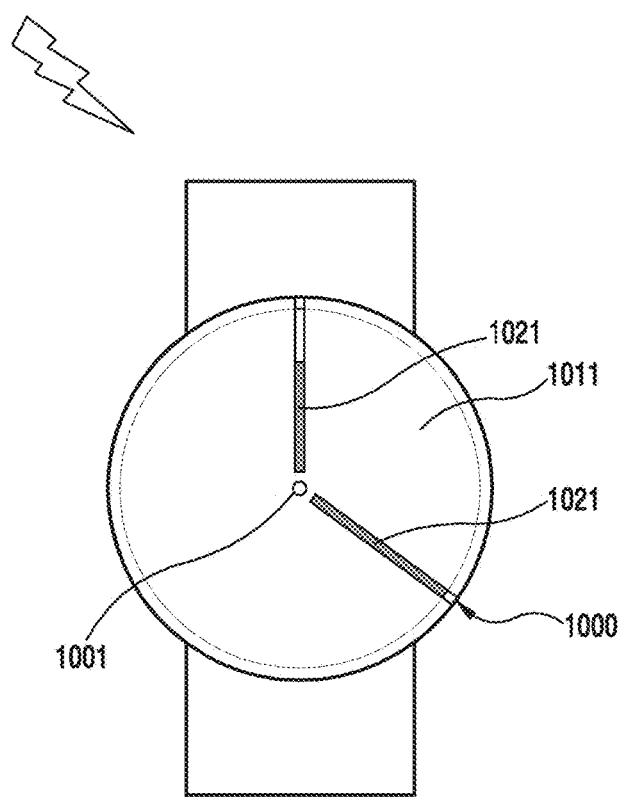
FIGS. 10A and 10B are views each illustrating an alarm arrival state indicated using a light-emitting diode (LED) in a wearable device according to various embodiments of the present disclosure.
Figure 10B:
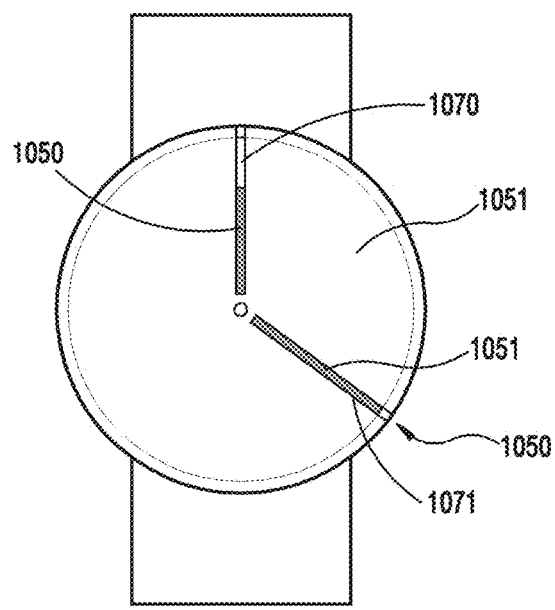

FIGS. 10A and 10B are views each illustrating an alarm arrival state indicated using a light-emitting diode (LED) in a wearable device according to various embodiments of the present disclosure.

Referring to FIG. 10A, the wearable device 1000 according to various embodiments may be the wearable device 100 illustrated in FIGS. 1A, 1B, and 1C. According to various embodiments of the present disclosure, upon receiving an alarm, the wearable device 1000 may indicate the alarm state using a light source 1001 in the display off state. For example, the alarm state may be indicated using an LED as the light source 1001. For example, when the LED is disposed in the center of the display region 1011 (disposed on a board) so that waves are guided, the center of the display region 1011 is irradiated in the display off state, and as a result, the user is able to grasp the alarm reception state.

For example, according to various embodiments of the present disclosure, the light source 1001 may be disposed at an end of the first member 1020 or the second member 1021 (the end adjacent to the center) so as to indicate the alarm state.

Referring to FIG. 10B, according to various embodiments of the present disclosure, upon receiving an alarm, the wearable device 1050 may indicate the alarm state using one or more light sources 1050 and 1051 in the off state of the display 1061. For example, an alarm state may be indicated by using each of the first and second LEDs 1050 and 1051 as the light source. For example, when the LED is disposed in a region other than the center of the display region 1011 (disposed on a board) so that waves are guided, the region around the center of the display region 1061 is irradiated in the display off state, and as a result, the user is able to grasp the alarm reception state.

For example, according to various embodiments of the present disclosure, each of the first and second LEDs 1050 and 1051 may be at least a portion or the whole of an hour hand 1070 or a minute hand 1071. According to various embodiments of the present disclosure, the hour hand 1070 may have a long portion that may be constituted or covered with a first LED 1050, and the minute hand 1071 may be constituted or covered with a second LED 1051.

Figure 11A:
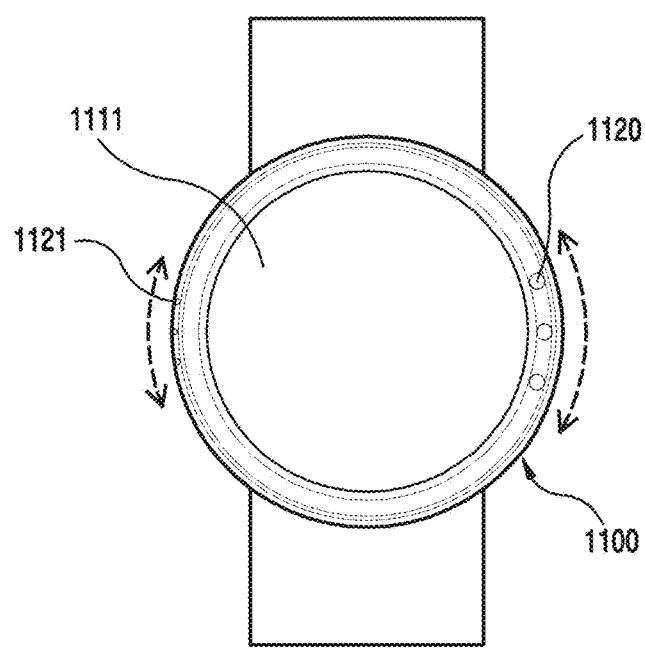
FIGS. 11A and 11B are views each illustrating an alarm arrival state indicated by a shaking of an object in a wearable device according to various embodiments of the present disclosure.
Figure 11B:
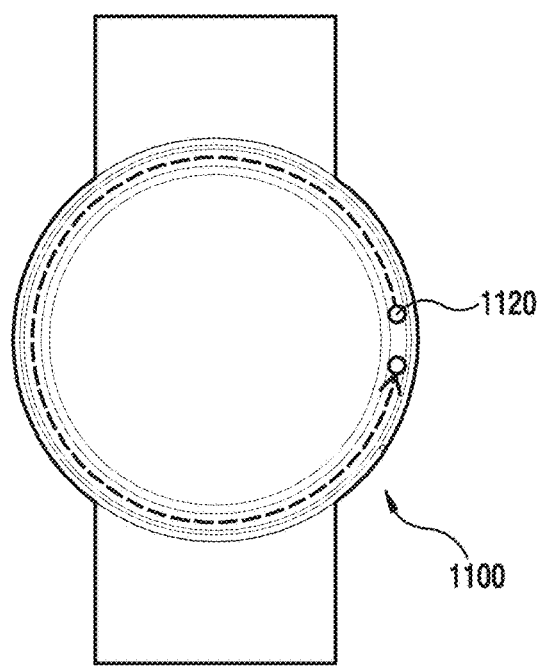

FIGS. 11A and 11B are views each illustrating an alarm arrival state indicated by a shaking of an object in a wearable device according to various embodiments of the present disclosure.

Referring to FIG. 11A, the wearable device 1100 according to various embodiments may be the electronic devices 500 and 600 illustrated in FIGS. 5, 6A, 6B, and 6C. When an alarm is received, in the display off state, it is possible to indicate the alarm state to the user using a first object 1120 positioned outside a display region 1111 that indicates hour or minute, a second object 1121, or the first and second objects 1120 and 1121. For example, the user may be notified of the alarm state by causing the first object 1120 indicating the hour to perform repeated vertical movements (vertical shaking) or repeated horizontal movements (horizontal shaking), by causing the second object 1121 indicating the second member to perform repeated vertical movements, or by causing the first and second objects 1120 and 1121 to perform repeated vertical movements in unison.

Referring to FIG. 11B, according to various embodiments of the present disclosure, upon receiving the alarm, the wearable device 1100 may indicate the alarm state to the user using the first object 1120 indicating hour. For example, the first object 1120 indicating hour may rotate about 360 degrees along the bezel region so as to notify the user of the alarm state. This may also be equally applied to the second object. For example, when the second object rotates about 360 degrees, the user may grasp the alarm reception state.

Figure 12A:
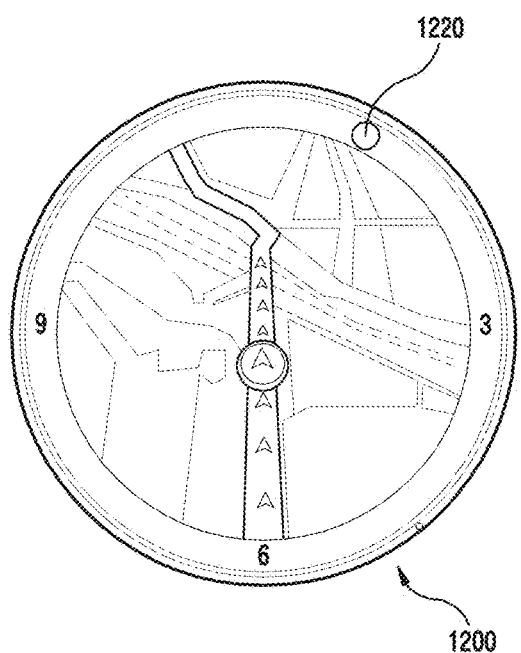
Figure 12B:
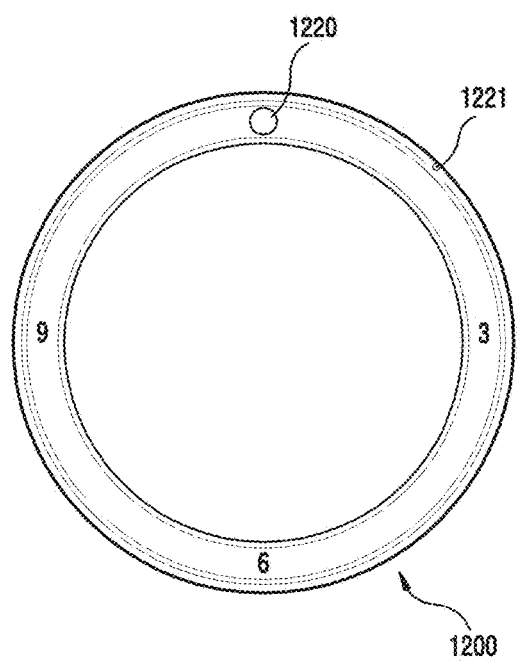

FIGS. 12A and 12B are views each indicating a moving direction using an object in a navigation mode of a wearable device according to various embodiments of the present disclosure, in which FIG. 12A illustrates a display on state and FIG. 12B illustrates a display off state.

Referring to FIG. 12A, the wearable device 1200 according to various embodiments may be the wearable device 600 illustrated in FIGS. 5 and 6A. According to various embodiments of the present disclosure, at a navigation mode, the wearable device 1200 may indicate the state of a moving direction or a direction to move using an object 1220. For example, when the object 1220 exists in a north easterly direction, it may be a case in which the user riding in a moving means is going in the north easterly direction or is scheduled to go in the north easterly direction.

In the wearable device 1200 according to various embodiments of the present disclosure, a processor may cause at least a portion of the display to display a map configured to include a path along which the user of the electronic device is to move. In addition, the processor may move a first electromagnet to be adjacent to a first position on a first physical path corresponding to a direction where the user is to move along the path, and may move a second electromagnet to be adjacent to a second position on a second physical path corresponding to the northward direction.

Referring to FIG. 12B, according to various embodiments of the present disclosure, in the display off state, the wearable device 1200 may indicate the state of a moving direction or a direction to move using first and second objects 1220 and 1221. For example, when the object 1220 exists in the northward direction, it may be a case in which the user riding in a moving means is going in the northward direction or is scheduled to go in the northward direction. For example, when the second object 1221 exists in the north easterly direction, it may be a case in which the user riding in a moving means is going in the north easterly direction or is scheduled to go in the north easterly direction.

A method of indicating basic information, and the like, using electronic ink, and the like, will be described with reference to FIGS. 13A, 13B, and 13C.

Figure 13A:
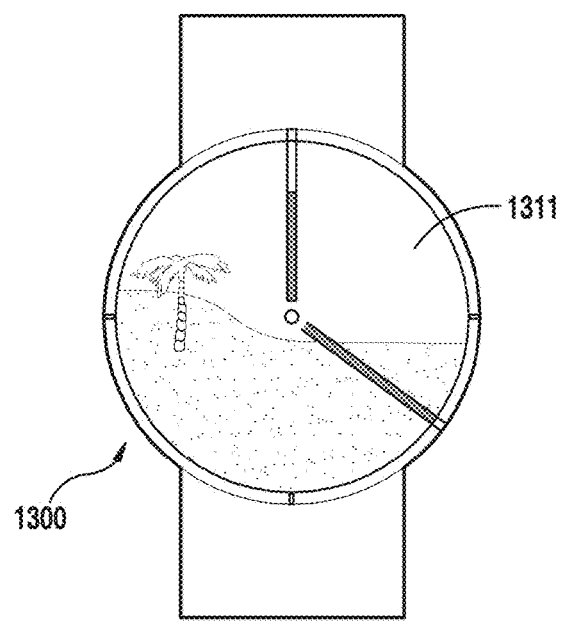
FIGS. 13A, 13B, and 13C are views illustrating first to third modes, which indicate a background, music, and weather, respectively, in a wearable device according to various embodiments of the present disclosure.
Figure 13B:
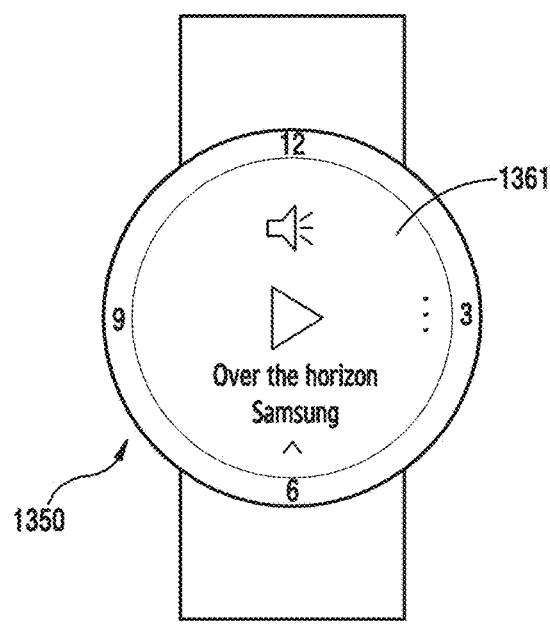
Figure 13C:
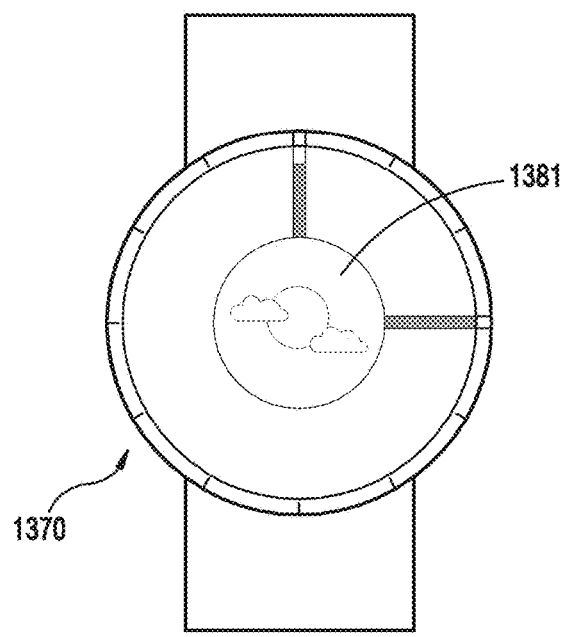

FIGS. 13A, 13B, and 13C are views illustrating first to third modes, which indicate a background, music, and weather, respectively, in a wearable device according to various embodiments of the present disclosure.

Referring to FIGS. 13A, 13B, and 13C, a wearable device 1300 may include a pattern that is related to basic information and is provided on the display 1311 as a background using an electronic ink, and the like.

For example, in the state where the display 1311 of the wearable device 1300 is turned off, the basic information may be displayed by applying a low power to the electronic ink printed on the top surface of the display 1311 as a background.

The wearable device 1300 illustrated in FIG. 13A may be the wearable device 100 illustrated in FIGS. 1A, 1B, and 1C. In the wearable device according to various embodiments of the present disclosure, when a low power is applied to the printed electronic ink in the display off state, the electronic ink pattern may become a background screen.

The wearable device 1350 illustrated in FIG. 13B may be the same as the wearable device 100 illustrated in FIGS. 1A, 1B, and 1C. In the wearable device 1350 according to various embodiments of the present disclosure, when a low power is applied to the printed electronic ink in a display 1361 off state, the electronic ink pattern may indicate a music mode.

The wearable device 1370 illustrated in FIG. 13C may be the same as the electronic device 800 illustrated in FIG. 8. In the wearable device 1370 according to various embodiments of the present disclosure, when a low power is applied to the printed electronic ink in the display 1381 off state, the electronic ink pattern may indicate background weather information.

For example, according to various embodiments of the present disclosure, in the state where the display 1381 is turned off, the wearable device 1370 may display basic information with a low power in a level of operation the electronic ink without using the display.

Figure 14A:
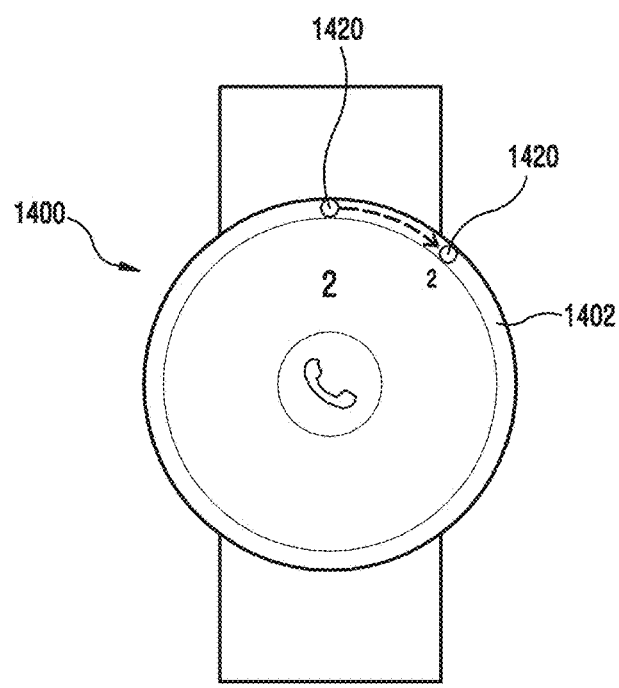
FIGS. 14A and 14B are views each illustrating a state of using an object existing in a bezel region as an input device in a wearable device in a state where a phone number is input according to various embodiments of the present disclosure.
Figure 14B:
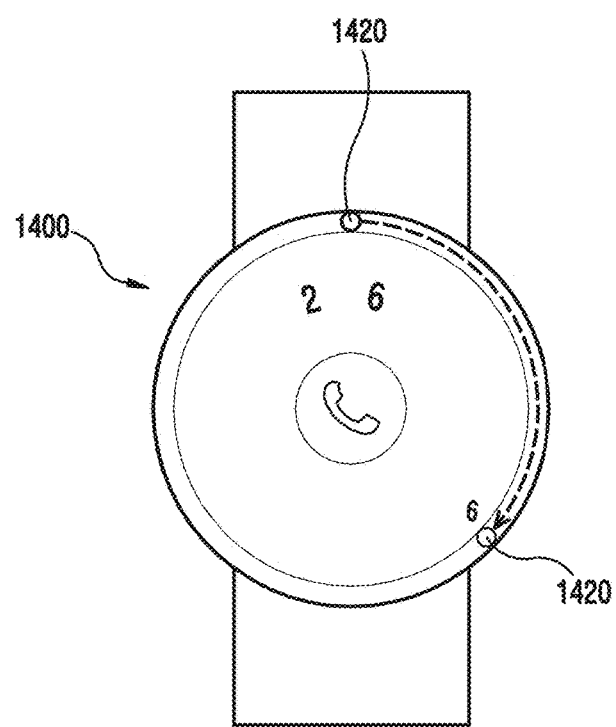

FIGS. 14A and 14B are views each illustrating a state of using an object existing in a bezel region as an input device in a wearable device in a state where a phone number is input according to various embodiments of the present disclosure.

Referring to FIG. 14A, in a wearable device 1400 including an object 1420, a desired phone number may be input depending on the rotating amount of the object 1420. For example, when the bezel region 1402 is divided into about 10 equal parts and the object 1420 is rotated by about two parts, a phone number "2" is input and the object 1420 may be returned to the original position thereof again.

Referring to FIG. 14B, when the object 1420 is rotated by about six parts again, a phone number "6" may be input, and the object 1420 may be returned to the original position thereof again. In this way, the phone number of a desired counterpart may be input with analog sensibility (in a rotary dial manner) using the object 1420.

Figure 15:
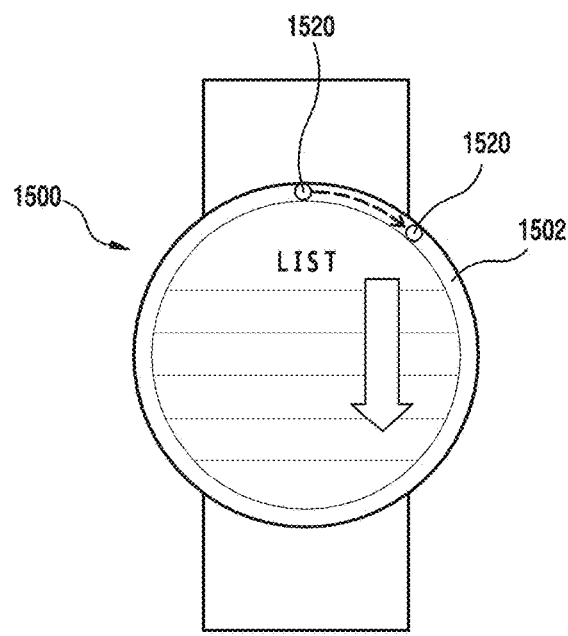
FIG. 15 is a view illustrating a state of using an object existing in a bezel region in a wearable device as an input device in which a state of dragging input a list is illustrated according to various embodiments of the present disclosure.

FIG. 15 is a view illustrating a state of using an object 1520 existing in the bezel region 1502 in a wearable device 1500 as an input device according to various embodiments of the present disclosure, in which a state of the dragging input of a list is illustrated.

Referring to FIG. 15, the wearable device 1500 can move a desired displayed list up or down depending on the rotating amount of the object 1520. For example, when the bezel region 1502 is divided into several equal parts and the object 1520 is rotated by about one part, an input may be made to move the list down, and the object may be returned to the original position thereof again. When the object 1520 is rotated by about two parts again, an input may be made to further move the list down, and the object 1520 may be returned to the original position thereof again.

Figure 16A:
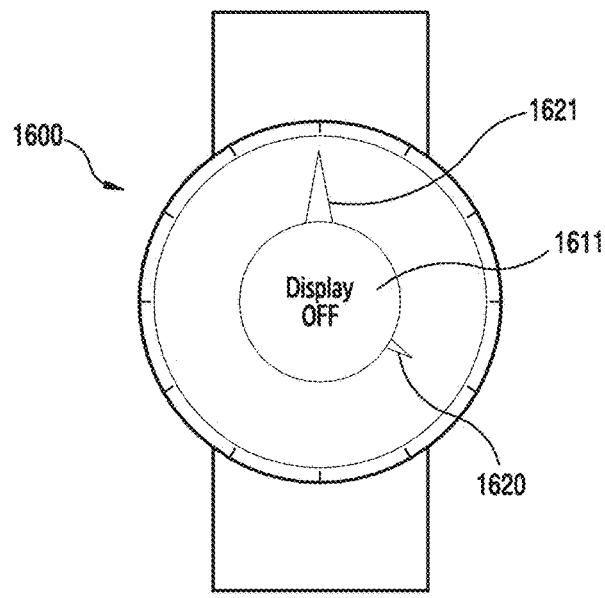
FIG. 16A is a view illustrating a wearable device in a display off state according to various embodiments of the present disclosure.
Figure 16B:
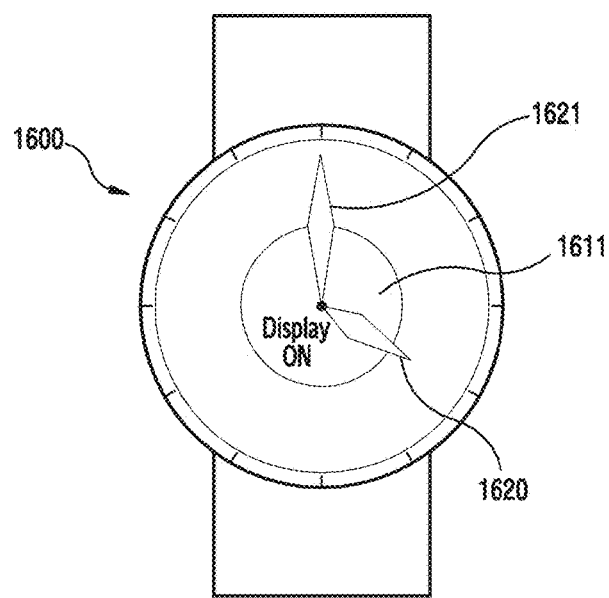
FIG. 16B is a view illustrating a wearable device in a display on state according to various embodiments of the present disclosure.

FIG. 16A is a view illustrating a wearable device in a display off state according to various embodiments of the present disclosure. FIG. 16B is a view illustrating a wearable device in a display on state according to various embodiments of the present disclosure.

Referring to FIGS. 16A and 16B, the wearable device may be the same as the wearable device 800 illustrated in FIG. 8.

Referring to FIG. 16A, a wearable device 1600 may physically indicate the hour and the minute using the first member 1620 and/or the second member 1621 in the state where the display is turned off.

Referring to FIG. 16B, the wearable device 1600 may indicate the hour and the minute using the first member 1620 and the second member 1621 in the state where the display is turned on. The hour and minute may be completely indicated by displaying each of the first and second members 1620 and 1621 in a completed (extending) form in the display region 1611. In the display region 1611, at least a partial region (e.g., half) of the first member 1620 or at least a partial region (e.g., half) of the second member 1621 may be indicated.

An electronic device according to various embodiments of the present disclosure includes: a housing including a first face that faces in a first direction, a second face that faces in a second direction that is opposite to the first direction, and a side face that at least partially encloses a space between the first face and the second face; a transparent substrate that forms at least a portion of the first face of the housing; a display disposed within the space of the housing, and exposed through at least a portion of the transparent substrate; a mechanical watch structure at least partially disposed between the transparent substrate and the display, and configured to be physically movable; a processor electrically connected to the display and the mechanical watch structure; and a memory electrically connected to the processor. The memory may store instructions that, when executed, cause the processor to control the display and the mechanical watch structure.

According to various embodiments of the present disclosure, the mechanical watch structure may include a first member configured to be movable so as to indicate the hour and a second member configured to be movable so as to indicate the minute.

According to various embodiments of the present disclosure, the first member may include a first end face configured to be in contact with a portion of an inner side face of the housing and to be movable along the inner side face, and a second end face that is opposite to the first end face, and the second member may include a first end face configured to be in contact with another portion of the inner side face of the housing and to be movable along the inner side face independently from the first member, and a second end face that is opposite to the first end face.

According to various embodiments of the present disclosure, the processor may determine whether the display is activated, and when it is determined that the display is activated, the instructions cause the first member and/or the second member to be fixed in a first shape, thereby not covering the display, and when the display is deactivated, the instructions may cause the process to fix the first member and/or the second member in a second shape, thereby indicating a time.

According to various embodiments of the present disclosure, the processor may determine that the display is activated, the instructions may cause the processor to fix the first member and/or the second member in a first shape such that a second end of the first member and a second end of the second member are adjacent to each other at a central portion of the display, thereby not covering the display, and when the display is deactivated, the instructions may cause the processor to fix the first member and/or the second member in a second shape such that the second end of the first member and the second end of the second member are in contact with an inner side face of the housing, thereby indicating a time.

According to various embodiments of the present disclosure, the first and second members may be disposed not to overlap with each other when viewed from an end face of the housing.

According to various embodiments of the present disclosure, at least a portion of the first member may be covered with a first color substance, and at least a portion of the second member may be covered with a second color substance.

According to various embodiments of the present disclosure, the region covered with the first color substance in the first member may be configured to be longer than the region covered with the second color substance in the second member.

The electronic device according to various embodiments of the present disclosure may further include a fixing member configured to fix a second end face of the first member or a second end face of the second member are fixed to an inner side face of the housing, and to be movable along the inner side face.

According to various embodiments of the present disclosure, the first member and/or the second member may include a shape memory material.

An electronic device according to various embodiments of the present disclosure may include: a housing including a first face that faces in a first direction, a second face that faces in a second direction that is opposite to the first direction, and a side face that at least partially encloses a space between the first face and the second face; a transparent substrate that forms at least a portion of the first face of the housing; a display disposed within the space of the housing, and exposed through at least a portion of the transparent substrate; at least one physical path forming at least one closed loop along a periphery of the display; and at least one spherical structure disposed to be movable along the at least one physical path in a third direction that is perpendicular to the first and second directions, and configured to indicate a time.

According to various embodiments of the present disclosure, the electronic device may further include at least one electromagnet disposed along the physical path within the space of the housing, and configured to attract the at least one spherical structure in the second direction.

According to various embodiments of the present disclosure, the electronic device may further include: a processor electrically connected to the display and the at least one electromagnet; and a memory electrically connected to the processor. The memory may store instructions that, when executed, cause the processor to move the at least one electromagnet along the at least one physical path based on at least one action executed in the electronic device.

According to various embodiments of the present disclosure, the at least one physical path may include a first physical path forming a closed loop along a periphery of the display, and a second physical path extending outside the periphery from the first physical path, the at least one spherical structure includes a first spherical structure disposed to be movable along the first physical path, and a second spherical structure disposed to be movable along the second physical path, and the at least one electromagnet may include a first electromagnet disposed to be movable along the first physical path, and a second electromagnet disposed to be movable along the second physical path.

According to various embodiments of the present disclosure, the instructions may cause, at a selected time, the processor to move the first electromagnet to be adjacent to a first position on the first physical path, which corresponds to hour of the selected time, and the instructions may cause the processor to move the second electromagnet to be adjacent to a second position on the second physical path, which corresponds to minute of the selected time.

In the wearable device according to various embodiments of the present disclosure, a processor may cause at least a portion of the display to display a map configured to include a path along which the user of the electronic device is to move. In addition, the processor may move a first electromagnet to be adjacent to a first position on a first physical path corresponding to a direction where the user is to move along the path, and may move a second electromagnet to be adjacent to a second position on a second physical path corresponding to the northward direction.

A wearable device according to various embodiments of the present disclosure may include: a main body; a display region disposed on a front face of the main body; a bezel region enclosing the display region; a watch structure disposed in the display region in a display off state to indicate the hour, and disposed in the bezel region in a display on state be concealed; and a drive unit disposed in the bezel region to provide a force to move the watch structure to the bezel region.

According to various embodiments of the present disclosure, the watch structure may include: a first rail disposed to be rotatable; an hour hand configured to move along the first rail to indicate the hour; a first drive unit disposed on the first rail, and connected to the hour hand to move the hour hand; a second rail disposed to overlap with the first rail, and to be rotatable coaxially with the first rail; a minute hand configured to move along the second rail to indicate the minute; and a second drive unit disposed on the second rail, and connected to the minute hand to move the minute hand.

A wearable device according to various embodiments of the present disclosure includes: a main body having a front face; a display region disposed on the front face; a non-display region disposed on the front face to enclose the display region; a watch structure configured to indicate the hour in the non-display region; and a drive unit disposed below the display region to be connected to the watch structure, which is disposed to be concealed below the display region.

A wearable device according to various embodiments of the present disclosure may include a main body; a display region disposed on a front face of the main body, a first bezel region enclosing the display region, a second bezel region enclosing the first bezel region, a first object accommodated in the first bezel region to indicate the hour, a second object accommodated in the second bezel region to indicate the minute, a first electromagnet mounted within the main body to provide a force to move the first object along a longitudinal direction of the first bezel region, and a second electromagnet mounted within the main body to provide a force to move the second object along a longitudinal direction of the second bezel region.

Hereinafter, an electronic device according to various embodiments will be described with reference to the accompanying drawings. In the present disclosure, the term "user" may indicate a person using an electronic device or a device (e.g., artificial intelligence wearable electronic device) using an electronic device.

Figure 17:
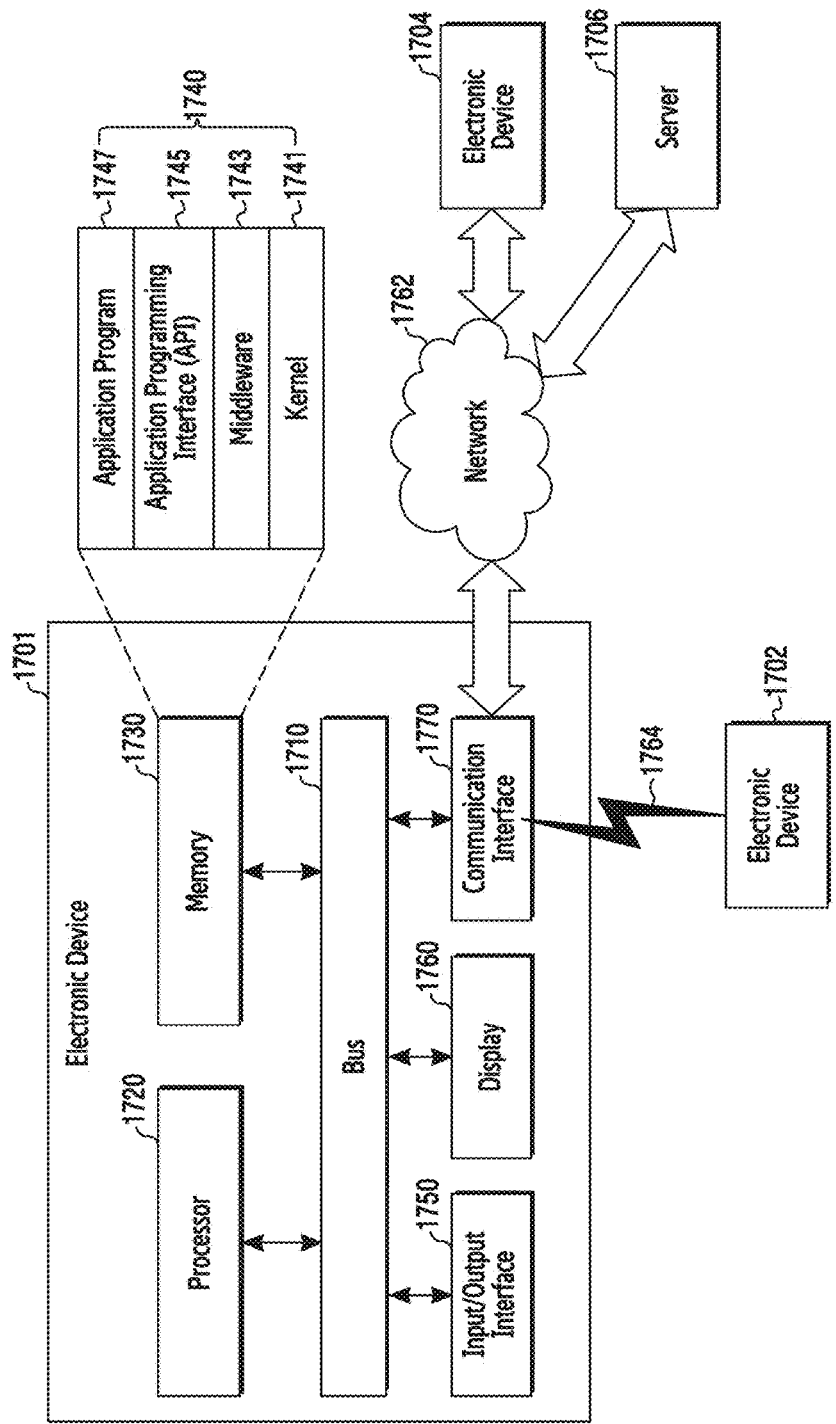
FIG. 17 is a view illustrating an electronic device within a network environment according to various embodiments of the present disclosure.

FIG. 17 is a view illustrating an electronic device within a network environment according to an embodiment of the present disclosure.

Referring to FIG. 17, an electronic device 1701 includes at least one of a bus 1710, a processor 1720, a memory 1730, an input/output interface 1750, a display 1760, and a communication interface 1770. According to the present disclosure, at least one of the components of the electronic device 1701 may be omitted, or other components may be additionally included in the electronic device 1701.

The bus 1710 is a circuit that interconnects the aforementioned elements and transmits communication signals (e.g., control messages) between the aforementioned elements.

The processor 1720 carries out operations or data processing related to control and/or communication of at least one other component (for example, the memory 1730, the input/output interface 1750, the display 1760, or the communication interface 1770) of the electronic device 1701.

The memory 1730 stores commands or data (e.g., a reference pattern or a reference touch area) associated with one or more other components of the electronic device 1701. According to one embodiment of the present disclosure, the memory 1730 stores software and/or a program 1740. For example, the program 1740 includes a kernel 1741, a middleware 1743, an application programming interface (API) 1745, an application program 1747, and the like, with one or more of the kernel 1741, the middleware 1743, and the API 1745 being referred to as an operating system (OS).

The kernel 1741 controls or manages system resources (e.g., the bus 1710, the processor 1720, or the memory 1730) used for performing an operation or function implemented by the other programs (e.g., the middleware 1743, the API 1745, or the application program 1747). Furthermore, the kernel 1741 provides an interface through which the middleware 1743, the API 1745, or the application program 1747 may access the individual elements of the electronic device 1701 to control or manage the system resources.

The middleware 1743, for example, functions as an intermediary for allowing the API 1745 or the application program 1747 to communicate with the kernel 1741 to exchange data. In addition, the middleware 1743 processes one or more task requests received from the application program 1747 according to priorities thereof. For example, the middleware 1743 assigns priorities for using the system resources (e.g., the bus 1710, the processor 1720, the memory 1730, and the like) of the electronic device 1701, to at least one application of the application program 1747. For example, the middleware 1743 performs scheduling or loading balancing on the one or more task requests by processing the one or more task requests according to the priorities assigned thereto.

The API 1745 is an interface through which the application program 1747 controls functions provided from the kernel 1741 or the middleware 1743, and may include, for example, at least one interface or function (e.g., instruction) for file control, window control, image processing, or text control.

The input/output interface 1750 forwards instructions or data input from a user through an input/output device (e.g., various sensors, such as an acceleration sensor or a gyro sensor, and/or a device, such as a keyboard or a touch screen), to the processor 1720, the memory 1730, or the communication interface 1770 through the bus 1710. For example, the input/output interface 1750 provides the processor 1720 with data on a user' touch entered on a touch screen. Furthermore, the input/output interface 1750 outputs instructions or data, received from, for example, the processor 1720, the memory 1730, or the communication interface 1770 via the bus 1710, through an output unit (e.g., a speaker or the display 1760).

The display 1760 includes, for example, a liquid crystal display (LCD), a LED display, an organic LED (OLED) display, a micro electro mechanical system (MEMS) display, an electronic paper display, and the like. The display 1760, for example, displays various types of content (e.g., a text, images, videos, icons, symbols, and the like) for the user. The display 1760 may include a touch screen and receive, for example, a touch, a gesture, proximity, a hovering input, and the like, using an electronic pen or the user's body part. According to an embodiment of the present disclosure, the display 1760 may display a web page.

The communication interface 1770, for example, sets communication between the electronic device 1701 and an external device (e.g., a first external electronic device 1702, a second external electronic device 1704, or a server 1706). For example, the communication interface 1770 connects to a network 1762 through wireless or wired communication to communicate with the external device (e.g., the second external electronic device 1704 or the server 1706).

The wireless communication may use at least one of, for example, long term evolution (LTE), LTE-advance (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include, for example, a short-range communication 1764. The short-range communication 1764 may include at least one of, for example, wireless fidelity (Wi-Fi), Bluetooth™ (BT), near field communication (NFC), and global positioning system (GPS).

Each of the first external electronic device 1702 and the second external electronic device 1704 may be a device which is the same as or different from the electronic device 1701. According to an embodiment of the present disclosure, the server 1706 may include a group of one or more servers. According to the present disclosure, all or a part of operations performed in the electronic device 1701 can be performed in the other electronic device or multiple electronic devices (e.g., the first external electronic device 1702 or the second external electronic device 1704 or the server 1706). According to an embodiment of the present disclosure, when the electronic device 1701 should perform some functions or services automatically or by a request, the electronic device 1701 may make a request for performing at least some functions related to the functions or services by another device (e.g., the first external electronic device 1702, the second external electronic device 1704, or the server 1706) instead of performing the functions or services by itself. The first external electronic device 1702, the second external electronic device 1704, or the server 1706 may perform a function requested from the electronic device 1701 or an additional function and transfer the performed result to the electronic device 1701. The electronic device 1701 can provide the requested function or service to another electronic device by processing the received result as it is or additionally. To this end, for example, cloud computing, distributed computing, or client-server computing technology may be used.

Figure 18:
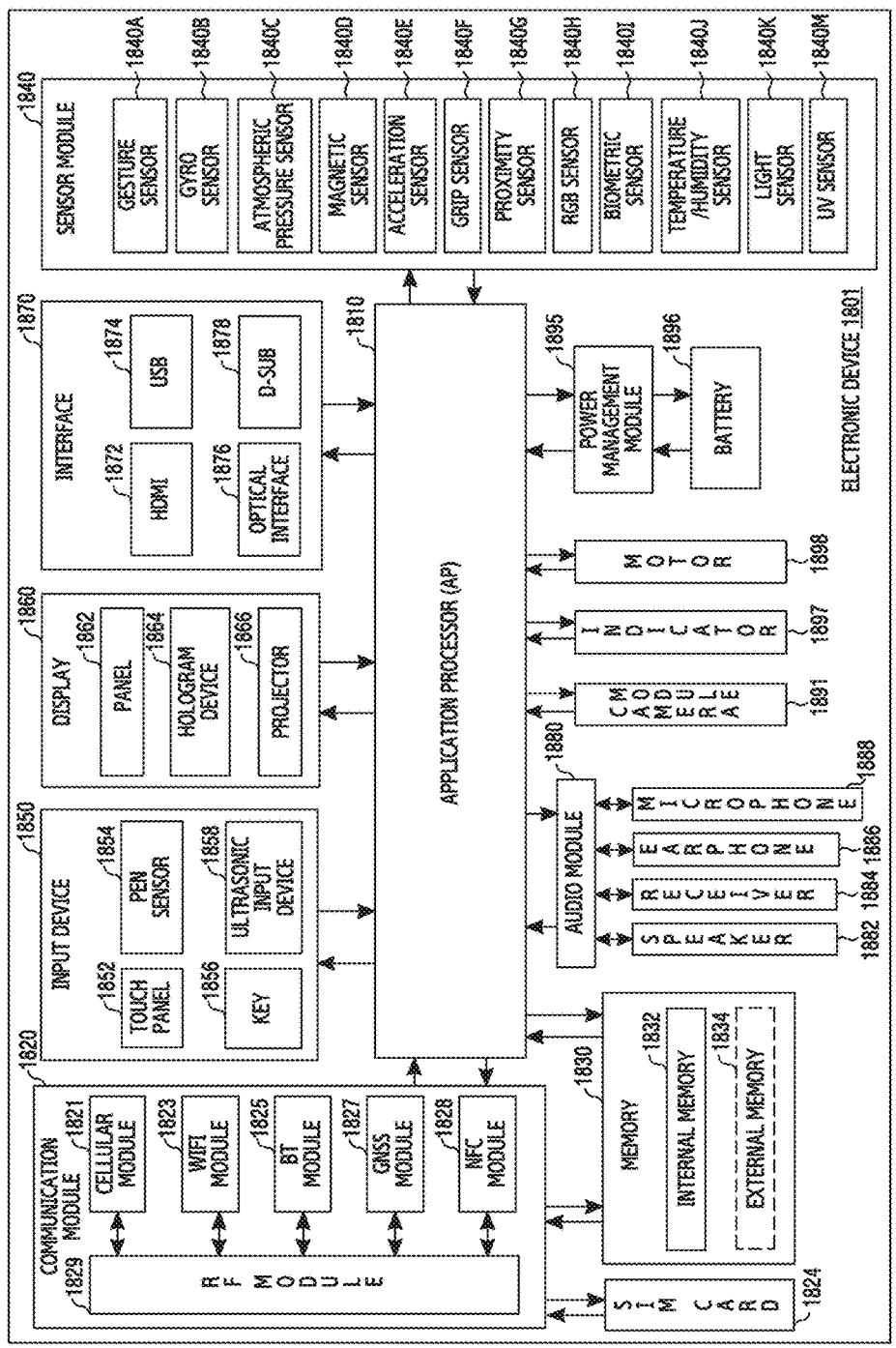
FIG. 18 is a block diagram of an electronic device according to various embodiments of the present disclosure.

FIG. 18 is a block diagram of an electronic device according to various embodiments of the present disclosure.

Referring to FIG. 18, an electronic device 1801 includes an AP 1810, a communication module 1820, a subscriber identification module (SIM) card 1824, a memory 1830, a sensor module 1840, an input device 1850, a display 1860, an interface 1870, an audio module 1880, a camera module 1891, a power management module 1895, a battery 1896, an indicator 1897, and a motor 1898.

The AP 1810 runs an operating system or an application program to control a plurality of hardware or software constituent elements connected to the AP 1810, and may perform processing and operation of various data including multimedia data. The AP 1810 may be, for example, implemented as a system on chip (SoC). According to an embodiment of the present disclosure, the AP 1810 further includes a graphical processing unit (GPU). The AP 1810 further includes at least one of other constitute elements (e.g., a cellular module 1821). The AP 1810 loads an instruction or data, which is received from a non-volatile memory connected to each or at least one of other constituent elements, to a volatile memory and processes the loaded instruction or data. In addition, the AP 1810 stores in the non-volatile memory, data received from at least one of the other constituent elements or generated by at least one of the other constituent elements.

The communication module 1820 performs data transmission/reception in communication between the electronic device 1801 and other electronic devices connected through a network. According to an embodiment of the present disclosure, the communication module 1820 includes the cellular module 1821, a Wi-Fi module 1823, a BT module 1825, a GNSS module 1827, an NFC module 1828, and a radio frequency (RF) module 1829.

The cellular module 1821 provides a voice telephony, a video telephony, a text service, an Internet service, and the like, through a telecommunication network (e.g., LTE, LTE-A, CDMA, WCDMA, UMTS, WiBro, GSM, and the like). In addition, the cellular module 1821 may, for example, use a SIM card 1824 to perform electronic device distinction and authorization within the telecommunication network. According to an embodiment of the present disclosure, the cellular module 1821 may perform at least some of functions that the AP 1810 may provide. For example, the cellular module 1821 performs at least one part of a multimedia control function.

The Wi-Fi module 1823, the BT module 1825, the GNSS module 1827 and the NFC module 1828 each may include, for example, a processor for processing data transmitted/received through the corresponding module. According to an embodiment of the present disclosure, at least some (e.g., two or more) of the cellular module 1821, the Wi-Fi module 1823, the BT module 1825, the GNSS module 1827 and the NFC module 1828 are included within one IC or IC package.

The RF module 1829 performs transmission/reception of data, for example, transmission/reception of an RF signal. The RF module 1829 may include, for example, a transceiver, a power amplifier module (PAM), a frequency filter, a low noise amplifier (LNA), an antenna and the like. According to an embodiment of the present disclosure, at least one of the cellular module 1821, the Wi-Fi module 1823, the BT module 1825, the GNSS module 1827 or the NFC module 1828 may perform transmission/reception of an RF signal through a separate RF module.

The SIM card 1824 includes a SIM, and may be inserted into a slot provided in a specific position of the electronic device 1801. The SIM card 1824 includes unique identification information (e.g., an integrated circuit card ID (ICCID)) or subscriber information (e.g., an international mobile subscriber identity (IMSI)).

The memory 1830 includes an internal memory 1832 or an external memory 1834. The internal memory 1832 includes, for example, at least one of a volatile memory (e.g., a dynamic random access memory (DRAM), a static RANI (SRAM) and a synchronous DRAM (SDRAM)) or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a not and (NAND) flash memory, and a not or (NOR) flash memory).

According to an embodiment of the present disclosure, the internal memory 1832 may be a solid state drive (SSD). The external memory 1834 may further include a flash drive, for example, compact flash (CF), secure digital (SD), micro-SD, mini-SD, extreme digital (xD), a memory stick, and the like. The external memory 1834 may be operatively connected with the electronic device 1801 through various interfaces.

The sensor module 1840 measures a physical quantity or detects an activation state of the electronic device 1801, and converts measured or detected information into an electric signal. The sensor module 1840 includes, for example, at least one of a gesture sensor 1840A, a gyro sensor 1840B, an air pressure sensor 1840C, a magnetic sensor 1840D, an acceleration sensor 1840E, a grip sensor 1840F, a proximity sensor 1840G, a color sensor 1840H (e.g., a red, green, blue (RGB) sensor), a bio-physical sensor 1840I, a temperature/humidity sensor 1840J, an illumination sensor 1840K, a UV sensor 1840M, and the like. Additionally or alternatively, the sensor module 1840 may also include, for example, an E-nose sensor, an electromyography (EMG) sensor, an electroencephalogram (EEG) sensor, an electrocardiogram (ECG) sensor, an infrared (IR) sensor, an iris sensor, a fingerprint sensor, and the like. The sensor module 1840 may further include a control circuit for controlling at least one or more sensors belonging therein.

The input device 1850 includes a touch panel 1852, a (digital) pen sensor 1854, a key 1856, an ultrasonic input device 1858, and the like. The touch panel 1852 may, for example, detect a touch input in at least one of a capacitive overlay scheme, a pressure sensitive scheme, an infrared beam scheme, and an acoustic wave scheme. The touch panel 1852 may also include a control circuit. In a case of the capacitive overlay scheme, physical contact or proximity detection is possible. The touch panel 1852 may further include a tactile layer, to provide a tactile response to a user.

The (digital) pen sensor 1854 may be implemented in the same or similar method to receiving a user's touch input or by using a separate sheet for detection. The key 1856 may include, for example, a physical button, an optical key, or a keypad. The ultrasonic input device 1858 is capable of identifying data by detecting a sound wave in the electronic device 1801 through an input tool generating an ultrasonic signal, and enables wireless detection. According to an embodiment of the present disclosure, the electronic device 1801 may also use the communication module 1820 to receive a user input from a connected external device (e.g., a computer or a server).

The display 1860 includes a panel 1862, a hologram device 1864, or a projector 1866. The panel 1862 may be, for example, an LCD, an active-matrix OLED (AMOLED), and the like. The panel 1862 may be, for example, implemented to be flexible, transparent, or wearable. The panel 1862 may be constructed as one module along with the touch panel 1852 as well. The hologram device 1864 may use interference of light to show a three-dimensional image in the air. The projector 1866 may project light to a screen to display an image. The screen may be, for example, located inside or outside the electronic device 1801. According to an embodiment of the present disclosure, the display 1860 may further include a control circuit for controlling the panel 1862, the hologram device 1864, or the projector 1866.

The interface 1870 includes, for example, a high-definition multimedia interface (HDMI) 1872, a universal service bus (USB) 1874, an optical interface 1876, or a D-subminiature (D-sub) 1878. Additionally or alternatively, the interface 1870 includes, for example, a mobile high-definition link (MHL) interface, an SD card/multimedia card (MMC) interface or an infrared data association (IrDA) standard interface.

The audio module 1880 converts a voice and an electric signal interactively. The audio module 1880 may, for example, process sound information which is inputted or outputted through a speaker 1882, a receiver 1884, an earphone 1886, a microphone 1888, and the like.

The camera module 1891 takes still pictures and moving pictures. According to an embodiment of the present disclosure, the camera module 1891 includes one or more image sensors (e.g., a front sensor or a rear sensor), a lens, an image signal processor (ISP), or a flash (e.g., an LED or a xenon lamp).

The power management module 1895 manages electric power of the electronic device 1801. The power management module 1895 includes, for example, a power management integrated circuit (PMIC), a charger IC, a battery, a battery gauge, and the like.

The PMIC may be, for example, mounted within an integrated circuit or an SoC semiconductor. A charging scheme may be divided into a wired charging scheme and a wireless charging scheme. The charger IC charges the battery 1896, and prevents the inflow of overvoltage or overcurrent from an electric charger. According to an embodiment of the present disclosure, the charger IC includes a charger IC for at least one of the wired charging scheme or the wireless charging scheme. The wireless charging scheme may, for example, be a magnetic resonance scheme, a magnetic induction scheme, an electromagnetic wave scheme, and the like. A supplementary circuit for wireless charging, for example, a circuit, such as a coil loop, a resonance circuit, a rectifier, and the like, may be added.

The battery gauge may, for example, measure a level of the battery 1896, a voltage during charging, a current or a temperature. The battery 1896 generates or stores electricity, and uses the stored or generated electricity to supply power to the electronic device 1801. The battery 1896 may include, for example, a rechargeable battery or a solar battery.

The indicator 1897 displays a specific status of the electronic device 1801 or one part (e.g., the AP 1810) thereof, for example a booting state, a message state, a charging state, and the like. The motor 1898 may convert an electric signal into a mechanical vibration. The electronic device 1801 may include a processing device (e.g., a GPU) for mobile television (TV) support. The processing device for mobile TV support may, for example, process media data according to the standards of digital multimedia broadcasting (DMB), digital video broadcasting (DVB), a media flow, and the like.

Each of the above-described elements of the electronic device may include one or more components, and the name of a corresponding element may vary according to the type of electronic device. The electronic device according to the present disclosure may include at least one of the above-described elements and may exclude some of the elements or further include other additional elements. Further, some of the elements of the electronic device according to the present disclosure may be coupled to form a single entity while performing the same functions as those of the corresponding elements before the coupling.

The term "module," as used herein may represent, for example, a unit including a combination of one or two or more of hardware, software, or firmware. The "module" may be, for example, used interchangeably with the terms "unit", "logic", "logical block", "component", or "circuit" and the like. The "module" may be the minimum unit of an integrally constructed component or a part thereof. The "module" may be also the minimum unit performing one or more functions or a part thereof. The "module" may be implemented mechanically or electronically. For example, the "module" may include at least one of an application-specific integrated circuit (ASIC) chip, field-programmable gate arrays (FPGAs) and a programmable-logic device performing some operations known to the art or to be developed in the future.

At least a part of an apparatus (e.g., modules or functions thereof) or method (e.g., operations) according to the present disclosure may be, for example, implemented as instructions stored in a computer-readable storage medium in a form of a programming module. In case that the instruction is executed by a processor, and the processor may perform functions corresponding to the instructions. The computer-readable storage media may be the memory 130, for instance.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a RAM, Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

The module or programming module according to the present disclosure may include at least one or more of the aforementioned constituent elements, or omit some of the aforementioned constituent elements, or further include additional other constituent elements. Operations carried out by the module, the programming module or the other constituent elements according to the present disclosure may be executed in a sequential, parallel, repeated or heuristic method. In addition, some operations may be executed in different order or may be omitted, or other operations may be added.

Accordingly, a method and electronic device are provided for controlling a display according to the present disclosure, to determine the priority of display based on a user's preference, thereby being able to decrease a search time for display and more quickly display a desired screen.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a housing including:
      a first face that faces in a first direction,
      a second face that faces in a second direction that is opposite to the first direction, and
      an inner side face that at least partially encloses a space between the first face and the second face;
   a transparent substrate that forms at least a portion of the first face of the housing;
   a display disposed within the housing, the display exposed through at least a portion of the transparent substrate;
   a mechanical watch structure at least partially disposed between the transparent substrate and the display, the mechanical watch structure being physically movable and includes a first member being movable to indicate an hour, and a second member being movable to indicate a minute;
   at least one processor configured to control the display and the mechanical watch structure;
   a memory for storing instructions and electrically connected to the at least one processor; and
   a fixing member configured to fix a second end face of the first member or a second end face of the second member to the inner side face of the housing to be movable along the inner side face,
   wherein the at least one processor is further configured to:
      determine whether the display is activated,
      fix, when the display is activated, the first member and the second member to in a first shape that does not cover the display, and
      fix, when the display is deactivated, the first member and the second member in a second shape that indicates time, and
   wherein the first shape is a curved shape with a curvature and the second shape is a linear shape.

2. The electronic device of claim 1,
   wherein the first member comprises:
      a first end face configured to be in contact with a portion of the inner side face of the housing and to be movable along the inner side face, and
      a second end face that is opposite to the first end face, and
   wherein the second member comprises:
      a first end face configured to be in contact with another portion of the inner side face of the housing and to be movable along the inner side face independently from the first member, and
      the second end face that is opposite to the first end face.

3. The electronic device of claim 2, wherein the at least one processor is further configured to:
   fix, when the display is activated, the first member and the second member in the first shape such that the second end face of the first member and the second end face of the second member are in contact with the inner side face of the housing that does not cover the display, and
   fix, when the display is deactivated, the first member and the second member in the second shape such that the second end face of the first member and the second end face of the second member are adjacent to each other at a central portion of the display that indicates time.

4. The electronic device of claim 1, wherein the first and second members do not overlap with each other when viewed from an end face of the housing.

5. The electronic device of claim 1, wherein at least a portion of the first member is covered with a first color substance, and at least a portion of the second member is covered with a second color substance.

6. The electronic device of claim 5, wherein the portion covered with the first color substance in the first member is shorter than the region covered with the second color substance in the second member.

7. The electronic device of claim 1, wherein the first member and the second member comprise a shape memory material.

8. A wearable device comprising:
- a main body;
- a display region disposed on a front face of the main body;
- a bezel region enclosing the display region;
- a watch structure disposed in the display region in a display off state to indicate an hour, and disposed in the bezel region in a display on state be concealed, the watch structure includes a first member being movable to indicate an hour, and a second member being movable to indicate a minute;
- a first driver and a second driver disposed in the bezel region to provide a force to move the watch structure to the bezel region;
- a fixing member configured to fix a second end face of the first member or a second end face of the second member to an inner side face of the main body to be movable along the inner side face; and
- at least one processor configured to:
    - determine whether the display region is activated,
    - fix, when the display region is activated, the first member and the second member in a first shape that does not cover the display region, and
    - fix, when the display region is deactivated, the first member and the second member in a second shape that indicates time, wherein the first shape is a curved shape with a curvature and the second shape is a linear shape.

9. The wearable device of claim 8, wherein the watch structure comprises:
- a first rail disposed to be rotatable;
- the first member including an hour hand being movable along the first rail to indicate the hour, and;
- a second rail disposed to overlap with the first rail, and to be rotatable coaxially with the first rail;

wherein the second member is a minute hand movable along the second rail to indicate the minute; and wherein the second driver is disposed on the second rail, and connected to the minute hand to move the minute hand, wherein the first driver is disposed on the first rail and connected to the hour hand to move the hour hand, and wherein the fixing member is a part of the first rail or the second rail.

* * * * *